US012202112B2

(12) United States Patent
Nettleton et al.

(10) Patent No.: US 12,202,112 B2
(45) Date of Patent: Jan. 21, 2025

(54) POWERED FASTENER DRIVER

(71) Applicant: MILWAUKEE ELECTRIC TOOL CORPORATION, Brookfield, WI (US)

(72) Inventors: Coby A. Nettleton, Milwaukee, WI (US); Leonard F. Mikat-Stevens, Milwaukee, WI (US); Marcus Wechselberger, Milwaukee, WI (US); David C. Graf, Greendale, WI (US); Alex D. Servais, Slinger, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 288 days.

(21) Appl. No.: 17/686,999

(22) Filed: Mar. 4, 2022

(65) Prior Publication Data

US 2022/0226978 A1 Jul. 21, 2022

Related U.S. Application Data

(63) Continuation-in-part of application No. 17/579,774, filed on Jan. 20, 2022, now Pat. No. 11,878,400.
(Continued)

(51) Int. Cl.
*B25C 5/15* (2006.01)
*B25C 1/06* (2006.01)
(Continued)

(52) U.S. Cl.
CPC .................. *B25C 5/15* (2013.01); *B25C 1/06* (2013.01); *B25C 5/162* (2013.01); *B25C 5/06* (2013.01)

(58) Field of Classification Search
CPC ................ B25C 1/06; B25C 5/15; B25C 5/06
(Continued)

(56) References Cited

U.S. PATENT DOCUMENTS

| | | | |
|---|---|---|---|
| 662,587 | A | 11/1900 | Blake |
| 2,001,288 | A | 5/1935 | Schorr |

(Continued)

FOREIGN PATENT DOCUMENTS

| | | | |
|---|---|---|---|
| CA | 2209875 | C | 6/2001 |
| CN | 203804923 | U | 9/2014 |

(Continued)

OTHER PUBLICATIONS

Extended European Search Report for Application No. 23159877.2 dated Nov. 15, 2023 (7 pages).

(Continued)

*Primary Examiner* — Joshua G Kotis
(74) *Attorney, Agent, or Firm* — Michael Best & Friedrich LLP

(57) ABSTRACT

A fastener driver includes a housing defining a head portion and a handle portion, a drive mechanism positioned within the housing, and a firing mechanism. The firing mechanism includes a piston, a driver blade attached to the piston, a biasing member having a first end supported within the piston and a second end supported by the head portion, and a damper positioned between the firing mechanism and the head portion of the housing. The damper configured to attenuate one or more of noise or vibration from the firing mechanism as the driver blade moves from the top dead center position toward the bottom dead center position.

16 Claims, 29 Drawing Sheets

Related U.S. Application Data

(60) Provisional application No. 63/180,722, filed on Apr. 28, 2021, provisional application No. 63/151,240, filed on Feb. 19, 2021, provisional application No. 63/139,549, filed on Jan. 20, 2021.

(51) Int. Cl.
*B25C 5/16* (2006.01)
*B25C 5/06* (2006.01)

(58) Field of Classification Search
USPC .......................................................... 227/140
See application file for complete search history.

(56) References Cited

U.S. PATENT DOCUMENTS

| | | | | |
|---|---|---|---|---|
| 2,003,062 | A | | 5/1935 | Wickwire |
| 2,351,608 | A | | 6/1944 | Greenwood |
| 2,441,552 | A | | 5/1948 | Barnes |
| 2,526,902 | A | | 10/1950 | Rublee |
| 2,632,356 | A | | 3/1953 | Thiel |
| 2,775,762 | A | * | 1/1957 | Hilti .......................... B25C 1/12 83/639.4 |
| 2,801,415 | A | | 8/1957 | Jenny |
| 2,801,417 | A | | 8/1957 | Jenny |
| 2,801,418 | A | | 8/1957 | Jenny |
| 2,914,032 | A | * | 11/1959 | Powers ................... B25C 1/041 91/356 |
| 2,918,674 | A | | 12/1959 | Skumawitz |
| 2,928,094 | A | * | 3/1960 | Crooks ..................... B27F 7/34 227/86 |
| 2,983,255 | A | * | 5/1961 | Crooks ................... B25C 1/041 92/85 R |
| 3,049,715 | A | | 8/1962 | Allen |
| 3,103,013 | A | | 9/1963 | Walter et al. |
| 3,170,160 | A | | 2/1965 | Burniston |
| 3,198,412 | A | | 8/1965 | Roosa |
| 3,325,074 | A | * | 6/1967 | Batlinger ............... G01G 23/14 227/8 |
| 3,407,983 | A | | 10/1968 | Kotas |
| 3,593,902 | A | | 7/1971 | Boye |
| 3,606,128 | A | | 9/1971 | Cast et al. |
| 3,615,049 | A | | 10/1971 | Obergfell et al. |
| 3,661,313 | A | | 5/1972 | Pomernacki et al. |
| 3,894,174 | A | | 7/1975 | Cartun |
| 3,924,692 | A | | 12/1975 | Saari |
| 3,940,844 | A | | 3/1976 | Colby et al. |
| 4,129,059 | A | | 12/1978 | Van Eck |
| 4,197,974 | A | | 4/1980 | Morton et al. |
| 4,227,637 | A | | 10/1980 | Haytayan |
| D261,356 | S | | 10/1981 | Robinson |
| 4,452,387 | A | | 6/1984 | Haytayan |
| 4,463,888 | A | | 8/1984 | Geist et al. |
| 4,515,303 | A | | 5/1985 | Schadlich et al. |
| 4,597,517 | A | | 7/1986 | Wagdy |
| 4,624,401 | A | | 11/1986 | Gassner et al. |
| 4,697,045 | A | | 9/1987 | Beatty |
| 4,804,127 | A | | 2/1989 | Kirkman |
| 4,811,885 | A | | 3/1989 | Lai |
| 5,094,380 | A | | 3/1992 | Nasiatka |
| D330,699 | S | | 11/1992 | Gill |
| 5,180,091 | A | | 1/1993 | Ota |
| 5,197,647 | A | | 3/1993 | Howell |
| 5,322,189 | A | | 6/1994 | Oda |
| 5,423,469 | A | * | 6/1995 | Armstrong .............. B25C 1/082 411/440 |
| 5,433,367 | A | | 7/1995 | Liu |
| 5,503,319 | A | | 4/1996 | Lai |
| 5,593,079 | A | | 1/1997 | Mukoyama et al. |
| 5,620,289 | A | | 4/1997 | Curry |
| 5,626,274 | A | | 5/1997 | Shkolnikov et al. |
| 5,720,423 | A | | 2/1998 | Kondo et al. |
| 5,735,444 | A | | 4/1998 | Wingert |
| 5,794,831 | A | | 8/1998 | Velan et al. |
| 5,816,468 | A | | 10/1998 | Yang |
| D402,540 | S | | 12/1998 | Stridh |
| 5,911,350 | A | | 6/1999 | Bolger et al. |
| 6,123,243 | A | * | 9/2000 | Pfister ....................... B25C 1/14 173/211 |
| 6,149,046 | A | | 11/2000 | Ho et al. |
| 6,199,739 | B1 | | 3/2001 | Mukoyama et al. |
| 6,209,770 | B1 | | 4/2001 | Perra |
| 6,296,167 | B1 | | 10/2001 | Jen |
| 6,305,891 | B1 | | 10/2001 | Burlingame |
| 6,450,387 | B1 | | 9/2002 | Chen |
| 6,530,803 | B1 | | 3/2003 | Chen |
| 6,592,014 | B2 | | 7/2003 | Smolinski |
| 6,648,202 | B2 | | 11/2003 | Miller et al. |
| 6,679,413 | B2 | | 1/2004 | Miller et al. |
| 6,772,931 | B2 | | 8/2004 | Miller et al. |
| 6,908,021 | B1 | | 6/2005 | Wang |
| 6,938,812 | B2 | | 9/2005 | Miller et al. |
| 6,964,362 | B2 | | 11/2005 | Shkolnikov et al. |
| 6,966,476 | B2 | | 11/2005 | Jalbert et al. |
| 6,966,477 | B1 | | 11/2005 | Chien-Kuo et al. |
| 7,000,294 | B2 | | 2/2006 | Kakuda et al. |
| 7,021,511 | B2 | | 4/2006 | Popovich et al. |
| 7,032,794 | B1 | | 4/2006 | Hung et al. |
| 7,032,797 | B2 | | 4/2006 | Liao |
| 7,059,507 | B2 | | 6/2006 | Almeras et al. |
| 7,086,573 | B1 | | 8/2006 | Wen |
| 7,111,767 | B2 | | 9/2006 | Losada |
| 7,134,586 | B2 | | 11/2006 | McGee et al. |
| 7,152,774 | B2 | | 12/2006 | Chen |
| 7,175,064 | B2 | | 2/2007 | Schell et al. |
| 7,185,712 | B2 | | 3/2007 | Miller et al. |
| 7,303,103 | B2 | | 12/2007 | Wang |
| 7,313,103 | B2 | | 12/2007 | Cox et al. |
| 7,320,422 | B2 | | 1/2008 | Schell et al. |
| 7,328,826 | B2 | | 2/2008 | Shkolnikov |
| 7,445,139 | B2 | | 11/2008 | Okouchi |
| 7,494,037 | B2 | | 2/2009 | Simonelli et al. |
| 7,506,787 | B2 | | 3/2009 | Wu et al. |
| 7,513,403 | B2 | | 4/2009 | Fujimoto |
| 7,520,414 | B2 | | 4/2009 | Blessing et al. |
| 7,527,106 | B2 | | 5/2009 | Miller et al. |
| 7,549,562 | B2 | | 6/2009 | Wu et al. |
| 7,575,141 | B1 | | 8/2009 | Liang et al. |
| 7,641,089 | B2 | | 1/2010 | Schell et al. |
| 7,874,778 | B1 | | 1/2011 | Derrig et al. |
| 7,905,377 | B2 | | 3/2011 | Krondorfer et al. |
| 7,905,379 | B2 | | 3/2011 | Lee |
| 7,918,374 | B2 | | 4/2011 | Gardner et al. |
| 7,934,565 | B2 | | 5/2011 | Krondorfer |
| 7,938,305 | B2 | | 5/2011 | Simonelli et al. |
| 7,980,439 | B2 | | 7/2011 | Akiba et al. |
| 8,006,883 | B2 | | 8/2011 | Schell et al. |
| 8,011,441 | B2 | | 9/2011 | Leimbach et al. |
| 8,011,547 | B2 | | 9/2011 | Leimbach et al. |
| 8,011,548 | B2 | | 9/2011 | Chang |
| 8,042,717 | B2 | | 10/2011 | Lam et al. |
| 8,047,414 | B2 | | 11/2011 | Kunz et al. |
| 8,074,855 | B2 | | 12/2011 | Johnson |
| 8,118,203 | B2 | | 2/2012 | Lee |
| 8,162,073 | B2 | | 4/2012 | Krondorfer et al. |
| 8,220,686 | B2 | | 7/2012 | Kestner et al. |
| 8,230,941 | B2 | | 7/2012 | Leimbach et al. |
| 8,245,896 | B2 | | 8/2012 | Gschwend et al. |
| 8,267,296 | B2 | | 9/2012 | Leimbach et al. |
| 8,267,297 | B2 | | 9/2012 | Leimbach et al. |
| 8,282,328 | B2 | | 10/2012 | Gardner et al. |
| 8,286,722 | B2 | | 10/2012 | Leimbach et al. |
| 8,292,143 | B2 | | 10/2012 | Lee et al. |
| 8,292,144 | B2 | | 10/2012 | Maltais et al. |
| 8,303,226 | B1 | | 11/2012 | Derrig et al. |
| 8,336,748 | B2 | | 12/2012 | Hlinka et al. |
| 8,387,718 | B2 | | 3/2013 | Leimbach et al. |
| 8,413,865 | B2 | | 4/2013 | Mandel et al. |
| 8,413,867 | B2 | | 4/2013 | Gardner et al. |
| 8,505,798 | B2 | | 8/2013 | Simonelli et al. |
| 8,556,148 | B2 | | 10/2013 | Schell et al. |
| 8,567,654 | B2 | | 10/2013 | Wu et al. |
| 8,602,282 | B2 | | 12/2013 | Leimbach et al. |

(56) References Cited

U.S. PATENT DOCUMENTS

| | | | |
|---|---|---|---|
| 8,690,036 B2 | 4/2014 | Schell et al. | |
| D705,930 S | 5/2014 | Cheney | |
| 8,733,609 B2 | 5/2014 | Weigmann et al. | |
| D707,357 S | 6/2014 | Cheney et al. | |
| 8,746,526 B2 | 6/2014 | Hlinka et al. | |
| 8,763,874 B2 | 7/2014 | McCardle et al. | |
| 8,777,079 B2 | 7/2014 | Po et al. | |
| 8,833,626 B2 | 9/2014 | Perron et al. | |
| 8,840,002 B2 | 9/2014 | Ito et al. | |
| 8,858,146 B1 | 10/2014 | Derrig et al. | |
| 8,899,460 B2 | 12/2014 | Wojcicki | |
| 8,939,340 B2 | 1/2015 | Gardner et al. | |
| 9,011,063 B1 | 4/2015 | Derrig et al. | |
| 9,221,161 B2 | 12/2015 | Miller et al. | |
| 9,302,381 B2 | 4/2016 | Kondou et al. | |
| 9,381,633 B2 | 7/2016 | Moore et al. | |
| 9,422,962 B1 | 8/2016 | Stratton et al. | |
| 9,469,021 B2 | 10/2016 | Gregory et al. | |
| 9,486,904 B2 | 11/2016 | Gregory et al. | |
| 9,498,871 B2 | 11/2016 | Gregory et al. | |
| 9,505,115 B2 | 11/2016 | Kondou et al. | |
| 9,527,197 B2 | 12/2016 | Blessing et al. | |
| 9,550,288 B2 | 1/2017 | Moore et al. | |
| 9,616,561 B2 | 4/2017 | Liu et al. | |
| 9,643,305 B2 | 5/2017 | Gregory et al. | |
| 9,649,755 B2 | 5/2017 | Gregory et al. | |
| 9,676,088 B2 | 6/2017 | Leimbach et al. | |
| 9,782,880 B2 | 10/2017 | Moore et al. | |
| 9,796,072 B2 | 10/2017 | Young | |
| 9,827,658 B2 | 11/2017 | Gregory et al. | |
| 9,849,502 B2 | 12/2017 | Gaertner et al. | |
| D836,072 S | 12/2018 | Gray | |
| 10,213,911 B2 | 2/2019 | Moore et al. | |
| 10,363,650 B2 | 7/2019 | Miyashita et al. | |
| 10,377,026 B2 | 8/2019 | Kondou et al. | |
| 10,442,066 B2 | 10/2019 | Nishikawa et al. | |
| 10,478,954 B2 | 11/2019 | Leimbach et al. | |
| 10,525,575 B2 | 1/2020 | Tanji | |
| 10,632,604 B2 | 4/2020 | Perron et al. | |
| 10,662,991 B2 | 5/2020 | Gray | |
| 10,695,899 B2 | 6/2020 | Scott | |
| 10,717,179 B2* | 7/2020 | Koenig | B25F 5/00 |
| 10,843,318 B2* | 11/2020 | Kobori | B25C 1/047 |
| 10,888,981 B2 | 1/2021 | Gregory et al. | |
| 10,926,387 B2 | 2/2021 | Moore et al. | |
| 10,967,491 B2 | 4/2021 | Yasutomi et al. | |
| 11,090,794 B2 | 8/2021 | Fairbanks et al. | |
| 2002/0079111 A1 | 6/2002 | Camp | |
| 2002/0117531 A1 | 8/2002 | Schell et al. | |
| 2002/0134811 A1 | 9/2002 | Napier et al. | |
| 2003/0000990 A1 | 1/2003 | White et al. | |
| 2003/0099102 A1 | 5/2003 | Duval | |
| 2003/0121948 A1 | 7/2003 | Hsien | |
| 2004/0126201 A1 | 7/2004 | Kobylinski et al. | |
| 2004/0247415 A1 | 12/2004 | Peter, Jr. | |
| 2004/0262461 A1 | 12/2004 | Del Re et al. | |
| 2006/0086589 A1 | 4/2006 | Chen | |
| 2006/0091177 A1 | 5/2006 | Cannaliato et al. | |
| 2006/0233628 A1 | 10/2006 | Lee | |
| 2008/0017689 A1 | 1/2008 | Simonelli et al. | |
| 2008/0048000 A1 | 2/2008 | Simonelli et al. | |
| 2008/0067212 A1 | 3/2008 | Wen | |
| 2008/0073405 A1 | 3/2008 | Shima et al. | |
| 2008/0164295 A1 | 7/2008 | Wu et al. | |
| 2009/0261141 A1 | 10/2009 | Stratton et al. | |
| 2010/0009608 A1 | 1/2010 | Lo et al. | |
| 2010/0147919 A1 | 6/2010 | Schiestl | |
| 2011/0220702 A1 | 9/2011 | Chen et al. | |
| 2011/0262247 A1 | 10/2011 | Kanai | |
| 2012/0211540 A1* | 8/2012 | Kondou | B25C 1/00 227/140 |
| 2013/0320063 A1 | 12/2013 | Gregory et al. | |
| 2013/0320064 A1 | 12/2013 | Gregory et al. | |
| 2014/0014703 A1 | 1/2014 | Kestner et al. | |
| 2014/0021237 A1 | 1/2014 | Chang | |
| 2014/0034700 A1 | 2/2014 | Chang | |
| 2014/0361066 A1 | 12/2014 | Liu et al. | |
| 2015/0063949 A1 | 3/2015 | Young | |
| 2015/0202755 A1 | 7/2015 | Tanji | |
| 2016/0368126 A1 | 12/2016 | Liu et al. | |
| 2017/0036333 A1 | 2/2017 | Lin et al. | |
| 2017/0157758 A1 | 6/2017 | Howe | |
| 2017/0274511 A1 | 9/2017 | Huang | |
| 2018/0029211 A1 | 2/2018 | Young | |
| 2018/0085904 A1 | 3/2018 | Gregory et al. | |
| 2018/0093370 A1 | 4/2018 | Yip et al. | |
| 2018/0099400 A1 | 4/2018 | Wong et al. | |
| 2019/0039219 A1 | 2/2019 | Suarez | |
| 2019/0091845 A1 | 3/2019 | Wyler et al. | |
| 2019/0101147 A1 | 4/2019 | Fairbanks et al. | |
| 2019/0152034 A1 | 5/2019 | Kargenian et al. | |
| 2019/0154070 A1 | 5/2019 | Kargenian et al. | |
| 2019/0154071 A1 | 5/2019 | Tao | |
| 2019/0255689 A1 | 8/2019 | Leimbach et al. | |
| 2019/0299379 A1 | 10/2019 | Kondou et al. | |
| 2019/0299380 A1 | 10/2019 | Meyer et al. | |
| 2019/0337135 A1 | 11/2019 | Kargenian et al. | |
| 2020/0070330 A1 | 3/2020 | Carrier et al. | |
| 2020/0083691 A1 | 3/2020 | Kawashima | |
| 2020/0114500 A1* | 4/2020 | Bierdeman | B25C 1/047 |
| 2020/0130158 A1* | 4/2020 | Bachmaier | B25C 1/047 |
| 2021/0078149 A1 | 3/2021 | Pedicini et al. | |
| 2021/0107125 A1 | 4/2021 | Gregory et al. | |
| 2021/0131470 A1 | 5/2021 | Wei | |
| 2021/0372451 A1 | 12/2021 | Nettleton | |

FOREIGN PATENT DOCUMENTS

| | | | |
|---|---|---|---|
| ES | 1009747 | U | 10/1989 |
| GB | 257753 | A | 9/1926 |
| GB | 843061 | A | 8/1960 |
| GB | 2238591 | A | 6/1991 |
| IN | 102773835 | B | 3/2016 |
| JP | S5676280 | A | 6/1981 |
| JP | S56118770 | A | 9/1981 |
| JP | H0293109 | A | 4/1990 |
| JP | H02203004 | A | 8/1990 |
| JP | 2002130232 | A | 5/2002 |
| JP | 2008238290 | A | 10/2008 |
| JP | 2016172289 | A | 9/2016 |
| JP | 2020019074 | A | 2/2020 |
| KR | 1020180097411 | A | 8/2018 |
| WO | 2007142996 | A2 | 12/2007 |
| WO | 2008094953 | A2 | 8/2008 |
| WO | 2020008768 | A1 | 1/2020 |

OTHER PUBLICATIONS

DeWalt, "DCN701 20V Max* Cordless Cable Stapler," Instruction Manual, © 2018 (52 pages).

International Search Report and Written Opinion for Application No. PCT/US2022/013053 dated Jun. 30, 2022 (14 pages).

Extended European Search Report for Application No. 22743138.4 dated Oct. 25, 2024 (8 pages).

* cited by examiner

POWERED FASTENER DRIVER

CROSS-REFERENCE TO RELATED APPLICATIONS

This application is a continuation-in-part of U.S. patent application Ser. No. 17/579,774 filed Jan. 20, 2022, now U.S. Pat. No. 11,878,400, which claims priority to U.S. Provisional Patent Application No. 63/180,722 filed on Apr. 28, 2021, U.S. Provisional Patent Application No. 63/151,240 filed on Feb. 19, 2021, and U.S. Provisional Patent Application No. 63/139,549 filed on Jan. 20, 2021, the entire contents of all of which are incorporated herein by reference.

FIELD OF THE INVENTION

The present invention relates to a powered fastener driver, and more particularly to a battery powered fastener driver.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

The present invention provides, in one aspect, a fastener driver including a housing defining a head portion and a handle portion, a drive mechanism positioned within the housing, and a firing mechanism including a piston, a driver blade attached to the piston, and a biasing member having a first end supported within the piston and a second end supported by the head portion. The biasing member configured to move the piston and the driver blade from a top dead center position toward a bottom dead center position. A damper positioned between the firing mechanism and the head portion of the housing. The damper configured to attenuate one or more of noise or vibration from the firing mechanism as the driver blade moves from the top dead center position toward the bottom dead center position. A lifter assembly operated by the drive mechanism to return the piston and the driver blade towards the top dead center position, against the bias of the biasing member.

The invention provides, in another aspect, a fastener driver including a housing defining a head portion and a handle portion, a drive mechanism positioned within the housing, and a firing mechanism including a guide member supported within the head portion of the housing, a piston slidable along the guide member, a driver blade attached to the piston and configured to be movable along a drive axis, and a biasing member configured to move the piston and the driver blade from a top dead center position toward a bottom dead center position. A lubrication member supported on the guide member, the lubrication member configured to release a lubricant to the guide member in response to the piston reaching the top dead center position or the bottom dead center position. A lifter assembly operated by the drive mechanism to return the piston and the driver blade towards the top dead center position, against the bias of the biasing member.

The invention provides, in another aspect, a fastener driver including a magazine configured to receive fasteners therein. A nosepiece including a fastener driving channel from which consecutive fasteners from the magazine are driven, a pusher body slidably coupled to the magazine, a biasing member configured to apply a first force to the pusher body in a first direction to bias the pusher body towards the nosepiece, and a means for applying a second force to the pusher body, the force-application means configured to apply the second force in a second direction that is different the first direction.

The invention provides, in another aspect, a fastener driver including a magazine configured to receive fasteners therein. The magazine including a length extending along a longitudinal axis between a first end and a second end, a top surface having an opening defined therein proximate the second end, parallel side walls respectively extending from opposite sides of the top surface, and a rib extending inward from at least one of the side walls along a first portion of the length of the magazine. A nosepiece including a fastener driving channel from which consecutive fasteners from the magazine are driven, a pusher body slidably coupled to the magazine, and a biasing member configured to bias the pusher body towards the nosepiece. The pusher body is configured to engage the rib as the pusher body moves along the first portion of the magazine Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
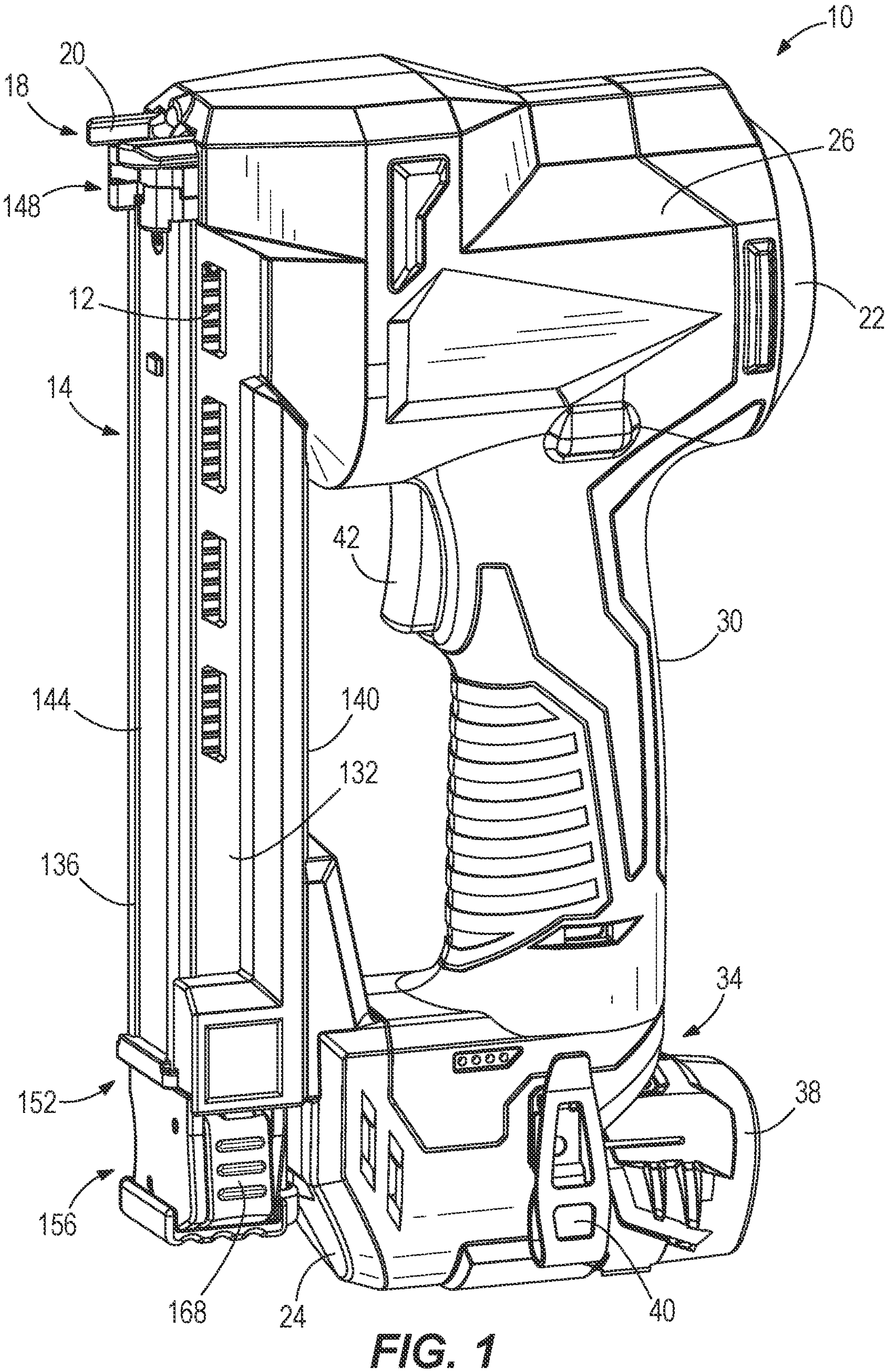
FIG. 1 is a perspective view of a powered fastener driver.

FIG. 1 illustrates a powered fastener driver 10 (e.g., a cable stapler) for driving fasteners 12 (e.g., staples of a staple collation) held within a magazine 14 into a workpiece. The driver 10 includes a nosepiece 18 that sequentially receives the fasteners from the magazine 14 prior to each fastener-driving operation. The nosepiece 18 includes a contact trip 20 that allows the driver 10 to be operated in a single shot mode. In some embodiments of the driver 10, the contact trip 20 may permit operation in the single shot mode and/or a bump or continuous shot mode. The driver 10 includes a housing 22 defining a head portion 26, a handle portion 30, and a battery receptacle portion 34 that receives a battery pack 38. In the illustrated embodiment, the housing 22 is longitudinally split at a parting line 24 into first and second housing portions. The driver 10 further includes a belt clip 40 secured to the housing 22 adjacent the battery receptacle 34.

Figure 2:
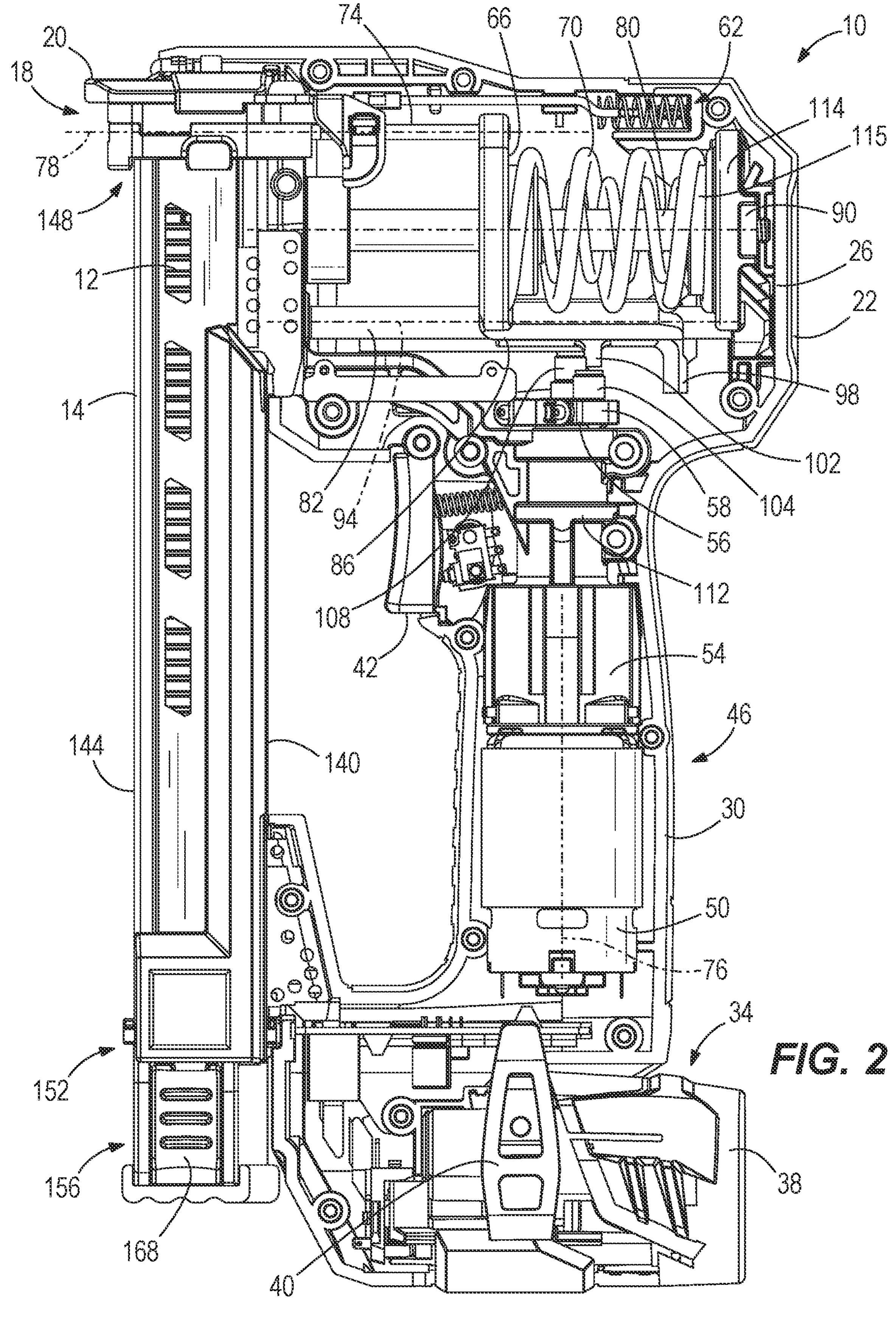
FIG. 2 is a side view of the powered fastener driver of FIG. 1, with portions removed for clarity, illustrating a drive mechanism, a firing mechanism, and a lifter assembly.

With reference to FIG. 2, the driver 10 includes a trigger 42 that selectively provides power to a drive mechanism 46 enclosed within the handle portion 30 of the driver 10. The drive mechanism 46 includes an electric motor 50, a gear box 54 that receives torque from the motor 50, and an output shaft 56 driven by the gear box 54. In some embodiment, the motor 50 is a brushed DC motor that receives power from the battery pack 38. In some embodiments of the driver 10, the motor 50 may be configured as a brushless direct current (DC) motor.

Figure 4:
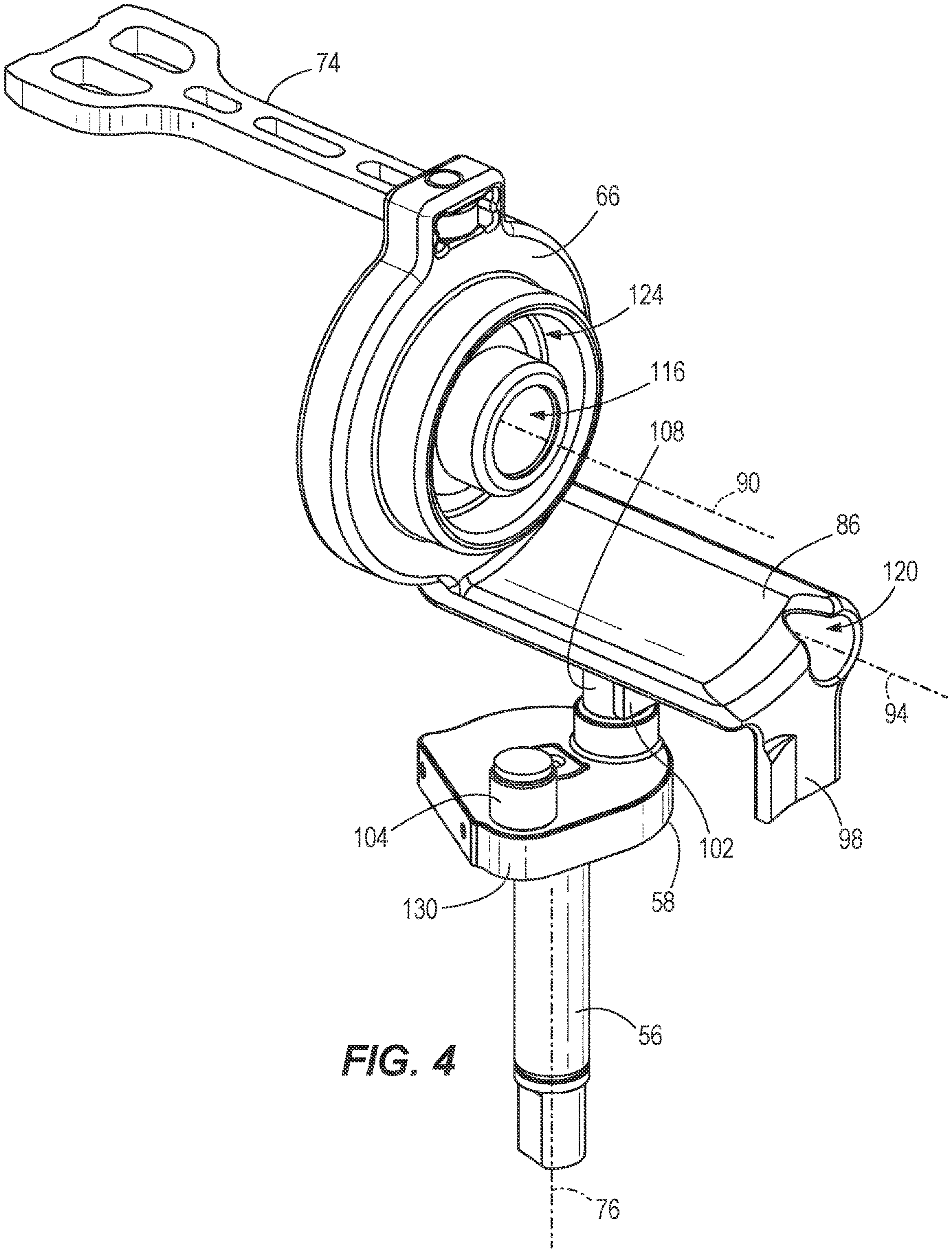
FIG. 4 is a perspective view of a portion of the lifter assembly and the firing mechanism of FIG. 3.

The powered fastener driver 10 includes a firing mechanism 62 within the head portion 26 of the housing 22. The firing mechanism 62 is coupled to the drive mechanism 46 and is operable to perform a fastener driving operation. The firing mechanism 62 includes a movable member (e.g., a piston 66) for reciprocal movement within the head portion 26, a biasing member (e.g., one or more compression springs 70, 72) seated against the piston 66, and a driver blade 74 attached to the piston 66 (FIG. 4). The biasing member 70 urges the piston 66 and the driver blade 74 within the head portion 26 towards a driven or bottom-dead center (BDC) position to drive the fastener 12 into the workpiece. In the illustrated embodiment, the biasing member includes a nested pair of compression springs 70, 72 that act in unison to urge the piston 66 and the driver blade 74 towards the BDC position.

A lifter assembly 58 is positioned between the drive mechanism 46 and the firing mechanism 62 and is operated by the drive mechanism 46 to return the piston 66 and the driver blade 74 towards a top-dead center (TDC) position, against the bias of the biasing member 70. During a driving cycle, the biasing member 70 of the firing mechanism 62 urges the driver blade 74 and piston 66 from the TDC position towards the BDC position to fire a fastener into the workpiece. The lifter assembly 58, which is driven by the drive mechanism 46, is operable to move the piston 66 and the driver blade 74 from the BDC position toward the TDC position, stopping short of the TDC position at an intermediate ready position, so the firing mechanism 62 is ready for a subsequent fastener driving operation.

Figure 3:
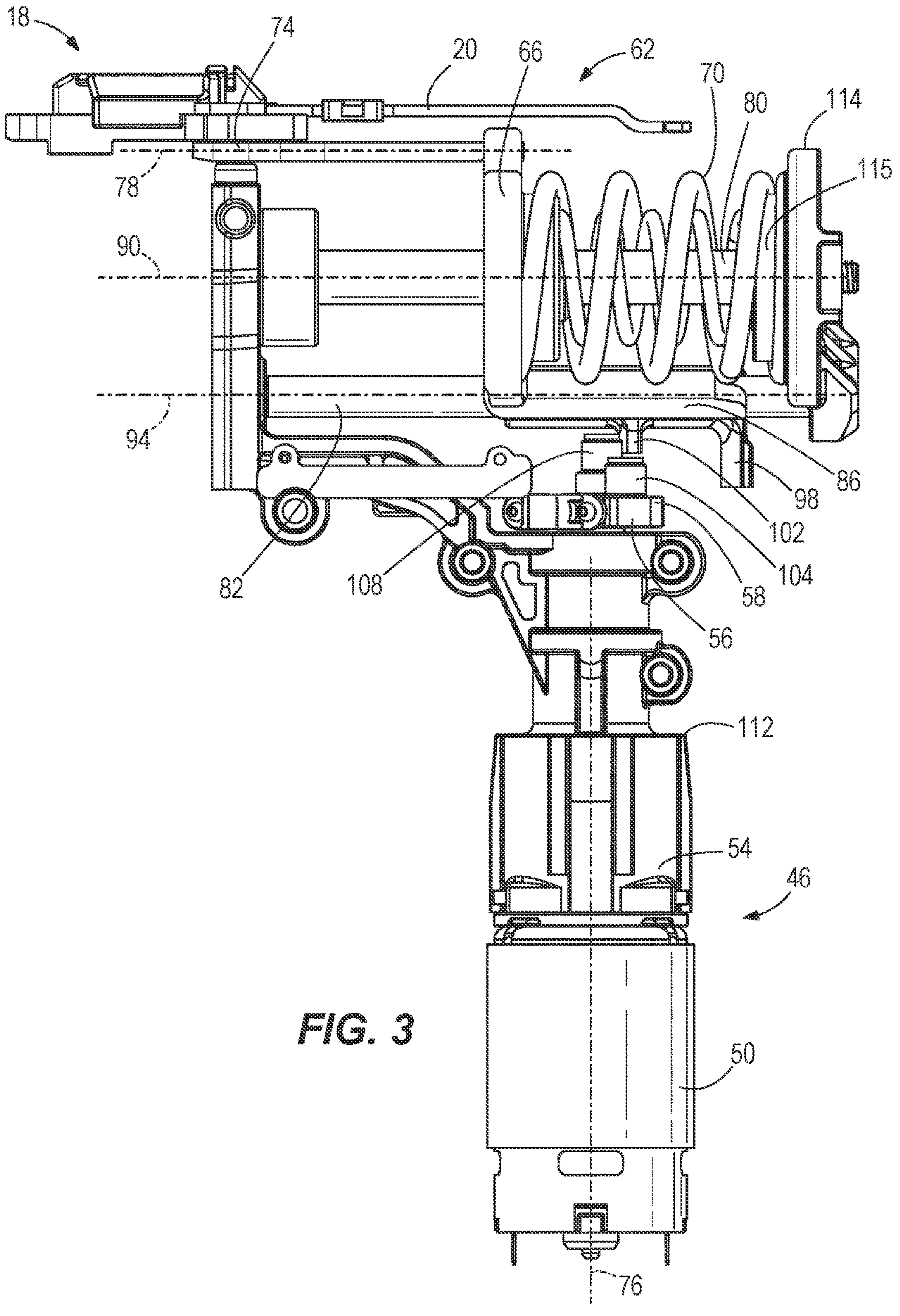
FIG. 3 is a side view of the drive mechanism, the firing mechanism, and the lifter assembly of the powered fastener driver of FIG. 1.

Now with reference to FIGS. 2 and 3, the driver 10 further includes a primary guide member (e.g., primary guide post 80) that slidably supports the piston 66 and a secondary guide member (e.g., secondary post 82), which slidably supports a bracket 86 coupled for movement with the piston 66, spaced from the primary guide post 80. The secondary post 82 is positioned between the primary guide post 80 and the lifter assembly 58 and is configured to slidably support the bracket 86. Because in the illustrated embodiment the piston 66 and the bracket 86 are integrally formed as a single piece, both of the primary and secondary guide posts 80, 82 slidably support the piston 66. In the illustrated embodiment, a primary guide axis 90 extends centrally through the primary guide post 80 and a secondary guide axis 94 extends centrally through the secondary post 82. The primary guide axis 90, the secondary guide axis 94, and the drive axis 78 are oriented parallel with each other and are each transverse to the motor axis 76. The primary and secondary guide posts 80, 82 are each cylindrical posts define guide surfaces that are devoid of any threads so the piston 66 can freely move along the primary and secondary guide posts 80, 82 in response to rotation of the lifter assembly 58

Now with reference to FIG. 4, the lifter assembly 58 and the piston 66 is illustrated in detail. The piston 66 defines a first bore 116 that is sized to receive and support the primary guide post 80 (FIG. 3) along the primary guide axis 90, a second bore 120 formed in the bracket 86, which is sized to receive and support the secondary guide post 82 (FIG. 3) along the secondary guide axis 94, and a cavity 124 surrounding the first bore 116 and sized to receive the biasing member 70 (FIG. 3). In the illustrated embodiment, the bracket 86 is integrally formed with the piston 66. In other embodiments, the bracket 86 may be formed separate from the piston 66 and may be coupled to the piston 66.

The bracket 86 includes a first protrusion 98 and a second protrusion 102 vertically spaced from the first protrusion 98 along the axis 94. The first and second protrusions 98, 102 each extend towards the lifter assembly 58. In the illustrated embodiment, the first protrusion 98 extends further from the bracket 86 (e.g., towards the lifter assembly 58) than the second protrusion 102. In other words, the first protrusion 98 is longer than the second protrusion 102. The lifter assembly 58 includes a first eccentric pin 104 and a second eccentric pin 108 that selectively engage with a corresponding one of the first and second protrusions 98, 102 formed on the bracket 86 of the piston 66. In the illustrated embodiment, the second eccentric pin 108 extends further from the lifter assembly 58 (e.g., towards the bracket 86) than the first eccentric pin 104 so the second eccentric pin 108 is sized to engage with the second protrusion 102. In other words, the second eccentric pin 108 is longer than the first eccentric pin 104. The construction of the lifter assembly 58 and the bracket 86 displaces the piston 66 and the driver blade 74 from the BDC position toward the TDC position during a single fastener driving cycle. Because the secondary guide member 82 is positioned adjacent and in close proximity to the lifter assembly 58 (e.g., in the bore 120), the physical deflection of the bracket 86, and thus the amount of bending stress experienced by the bracket 86, is reduced when the lifter assembly 58 moves the piston towards the TDC position.

With continued reference to FIGS. 2 and 3, the fastener driver 10 includes a frame 112 coupled to the housing 22 for supporting the lifter assembly 58 and a first end of each of the primary and secondary guide posts 80, 82. The frame 112 also defines a housing, which is a component of the gear box 54, in which a gear train (not shown) is located. In other words, the gear box 54 is integrally formed on the frame 112. The output shaft 56 extends through an aperture in the frame 112 with the lifter assembly 58 located adjacent and in close proximity to a vertical face of the frame 112 oriented perpendicular to the axis 76. An end cap 114 within the housing 22 supports an opposite, second end of each of the primary and secondary guide posts 80, 82. The end cap 114 includes a seat 115 (FIG. 3) against which a top end of the spring 70 is seated. The frame 112 is constructed as a single member, which supports the lifter assembly 58, while allowing rotatable movement of the lifter assembly 58, and rigidly supports the primary and secondary guide posts 80, 82 within the housing 22. In the illustrated embodiment, the frame 112 has a first portion positioned within the head portion 26 of the housing 22 and a second portion positioned within the handle portion 30. The construction of the frame 112 allows the firing mechanism 62 and the drive mechanism 46 to be assembled separately (e.g., as shown in FIG. 3) and inserted within the housing 22. As a result, this allows for a more compact arrangement of the firing mechanism 62 and the drive mechanism 46, which reduces the overall size of the driver 10.

Now with reference to FIG. 2, the powered fastener driver 10 includes a length L defined between a front end of driver 10 (e.g., a front end of the contact trip 20) and a rear end of the housing 22 (e.g., the head portion 26). The length L of the driver 10 is less than or equal to 18 centimeters. In the illustrated embodiment, the length L is 16.5 centimeters. In some embodiments, the length L may be in a range from 12.5 centimeters to 18 centimeters. In some embodiments, the length L may be in a range from 12.5 centimeters to 16.5 centimeters.

Figure 5:
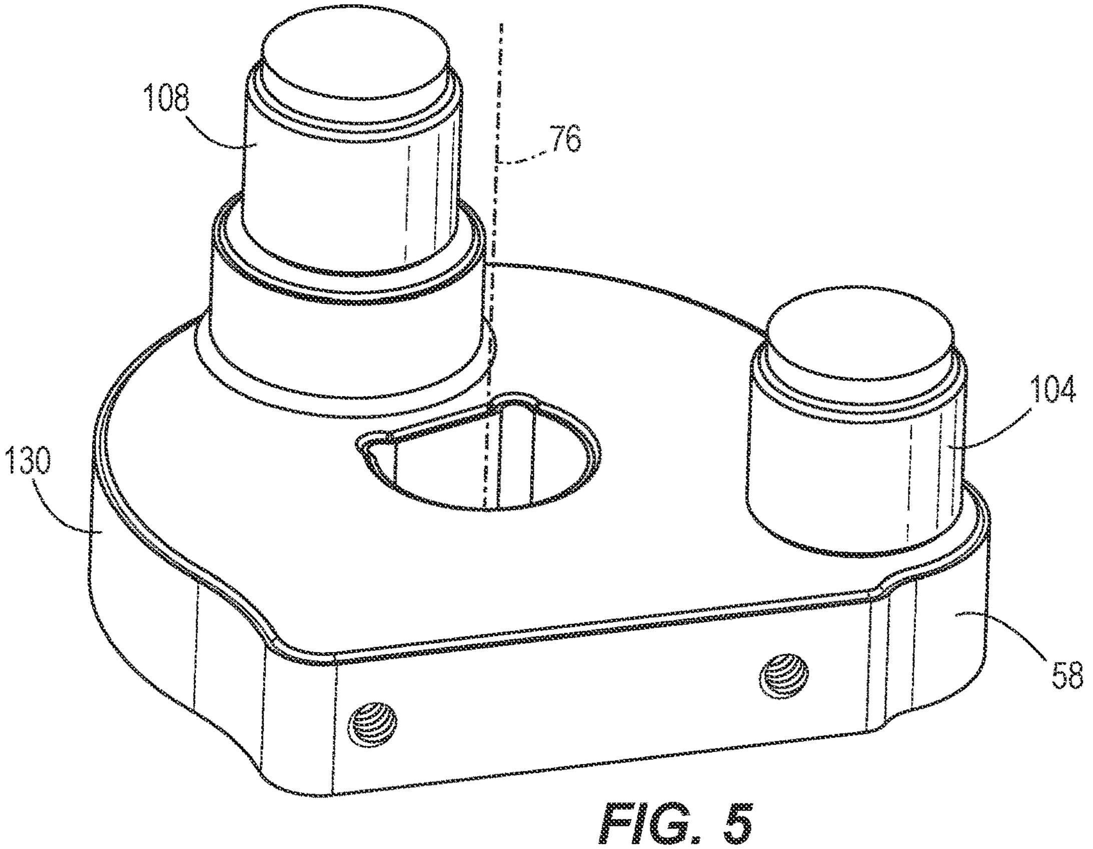
FIG. 5 is a perspective view of the portion of the lifter assembly shown in FIG. 4.
Figure 6:
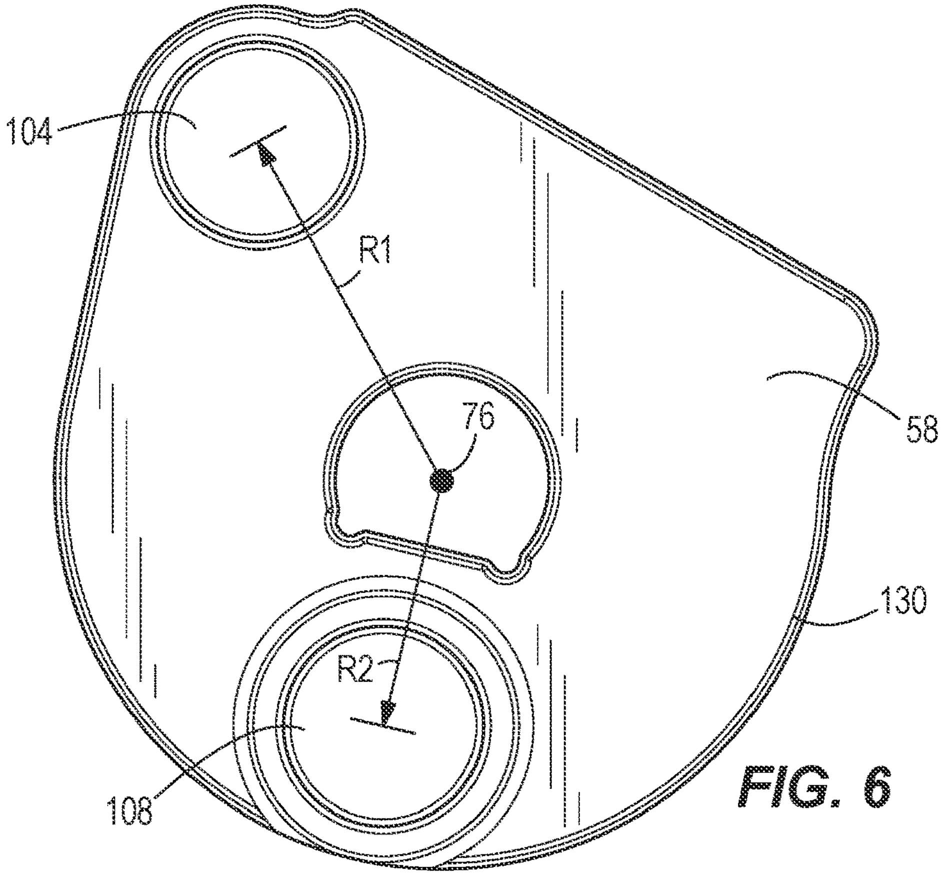
FIG. 6 is a top view of the portion of the lifter assembly shown in FIG. 4.

Now with reference to FIGS. 5 and 6, the lifter assembly 58 includes an outer circumferential surface 130. Each of the eccentric pins 104, 108 are arranged proximate the outer circumferential surface 130. In addition, the first eccentric pin 104 is positioned at a first radial distance R1 relative to a rotational axis of the lifter assembly 58 (i.e., the motor axis 76). The second eccentric pin 108 is positioned at a second radial distance R2 that is less than the first radial distance R1 of the first eccentric drive pin 104. As such, the eccentric pins 104, 108 of the lifter assembly 58 are positioned at different radial distances R1, R2 relative to the axis 76. In other words, the eccentric pins 104, 108 are radially offset with respect to each other.

Now with reference to FIG. 2, when the piston 66 is moved from the bottom-dead-center (BDC) position to the top-dead-center (TDC) position, the lifter assembly 58 rotates so the second eccentric pin 108 engages the second protrusion 102 of the bracket 86 of the piston 66. Because the second eccentric pin 108 is positioned at the smaller, second radial distance R2 than the first eccentric pin 104, less reaction torque is applied on the motor 50 by the spring 70 when the piston 66 is stationary in the ready position between the BDC and TDC positions. Additionally, because the first eccentric pin 104 is shorter than the second eccentric pin 108, during rotation of the lifter assembly 58, only the second eccentric pin 108 is capable of engaging the second protrusion 102. In other words, the first eccentric pin 104 has a first height and the second eccentric pin has a second height that is larger than the first height.

For example, the lifter assembly 58 is driven to rotate in a first direction by the drive mechanism 46 so the first and second eccentric pins 104, 108 engage the first and second protrusions 98, 102 in sequence, which returns the piston 66 and the driver blade 74 from the BDC position toward the TDC position. Since the radius R2 of the second eccentric pin 108 is smaller than the radius R1 of the first eccentric pin 104, the second eccentric pin 108 has a lower linear velocity than the linear velocity of the first eccentric pin 104 when the lifter assembly 58 is rotated by the motor 50. As a result, the higher linear velocity of the first eccentric pin 104 increases firing speeds by returning the piston 66 to the TDC position faster while the lower linear velocity of the second eccentric pin 108 reduces the reaction torque on the motor 50.

In operation, at the conclusion of a first drive cycle, the motor 50 rotates the output shaft 56, and therefore the lifter assembly 58, about a motor axis 76 to drive the piston 66 and the driver blade 74 toward the TDC position, compressing the biasing member 70. Prior to reaching the TDC position, the motor 50 is deactivated and the piston 66 and the driver blade 74 are held in a ready position, which is located between the TDC and the BDC positions, concluding a first drive cycle. When trigger 42 is actuated to initiate a subsequent, second drive cycle, the lifter assembly 58 is again rotated by the motor 50, which releases the biasing member 70 and drives the piston 66 and the driver blade 74 toward the BDC position, which causes the driver blade 74 to move about a drive axis 78 and thereby driving the fastener 12 into the workpiece. Following the release of the biasing member 70, the lifter assembly 58 returns the piston 66 towards the TDC position in preparation for another subsequent drive cycle.

Figure 7:
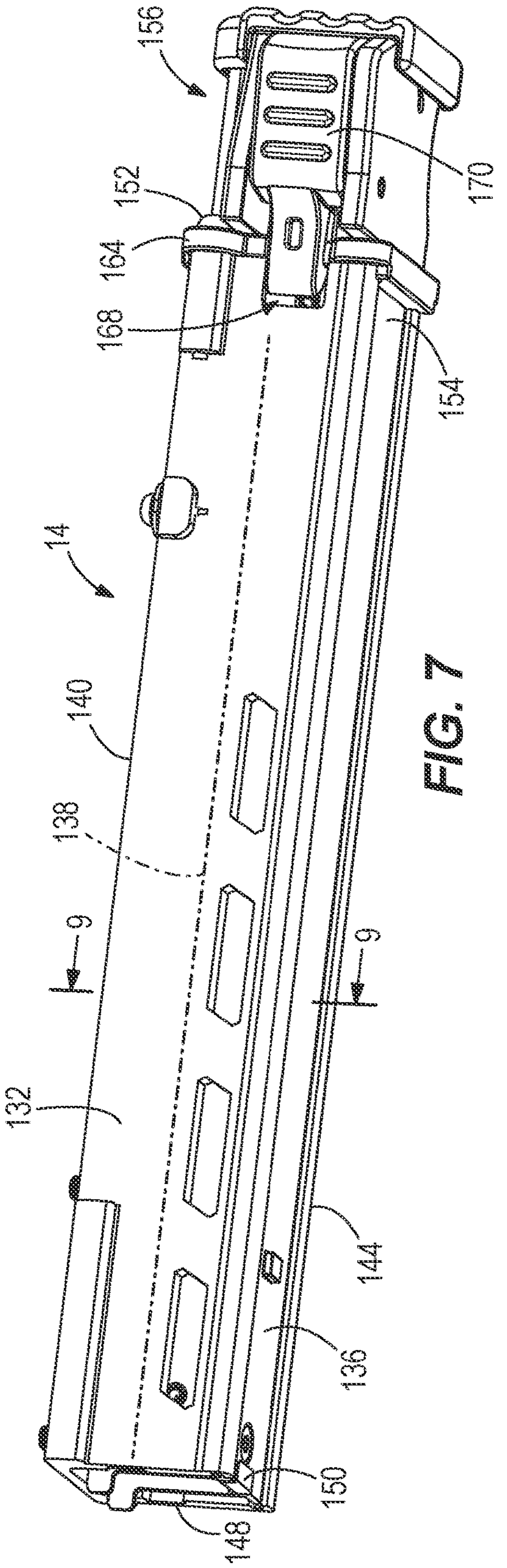
FIG. 7 is a perspective view of a magazine of the powered fastener driver of FIG. 1, illustrating the magazine in a closed position.
Figure 8:
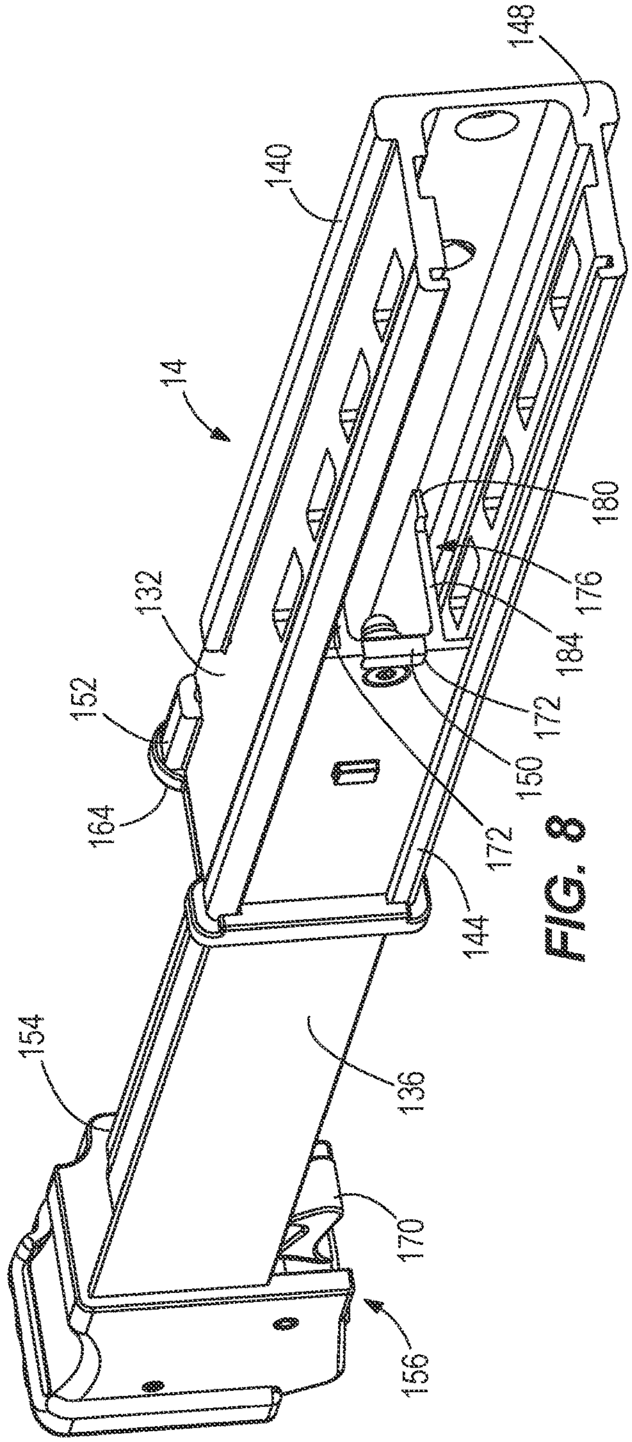
FIG. 8 is another perspective view of the magazine of FIG. 7, illustrating the magazine in an open position.

Now with reference to FIGS. 7-11, the magazine 14 includes an outer magazine cover 132 and an inner magazine body 136 received within the outer magazine cover 132. The inner magazine body 136 is slidable relative to the outer magazine cover 132 between a first, closed position (FIG. 7), and a second, open position (FIG. 8). The magazine 14 includes a top surface 140, which is secured to the driver (FIG. 1), and a bottom surface 144 that engages the workpiece and is opposite the top surface 140. The outer magazine cover 132 includes a first, front portion 148 adjacent the nosepiece 18 (FIG. 1), and a second, rear portion 152 adjacent the battery receptacle 34. The inner magazine body 136 includes a front portion 150 and a rear portion 154 opposite the front portion 148. For example, when the magazine 14 is in the closed position, the inner magazine body 136 is positioned entirely within an interior cavity defined by the outer magazine cover 132 so the front portion 150 and the rear portion 154 of the inner magazine body 136 respectively aligns with the front portion 148 and the rear portion 152 of the outer magazine cover 132. The magazine 14, therefore, has a length extending along a longitudinal axis 138 between the front and rear portions 148, 152 of the outer magazine cover 132. When the inner magazine body 136 is moved towards the open position, the inner magazine body 136 slides (to the right from the reference of frame of FIG. 7 and to the left from the frame of reference of FIG. 8) until the front portion 150 of the inner magazine body 136 is positioned proximate the rear portion 152 of the outer magazine cover 132. The magazine 14 has a length extending along the longitudinal axis 138 between the front portion 148 of the outer magazine cover 132 and a rear portion 154 of the inner magazine body 136.

A lock assembly 156 is positioned at the rear portion 152 of the inner magazine body 136. The lock assembly 156 includes a flange portion 160 (FIG. 11) positioned within the inner magazine body 136, which secures the lock assembly 156 to the inner magazine body 136. The lock assembly 156 is configured to selectively couple the inner magazine body 136 to the outer magazine cover 132 to maintain the inner magazine body 136 in the closed position. In the illustrated embodiment, a latching bracket 164 is coupled to the outer magazine cover 132 adjacent the rear portion 152 of the magazine 14 and a latching recess 168 (FIG. 10) is formed in a side surface of the outer magazine cover 132.

The lock assembly 156 includes a latch member 170 that selectively engages the latching bracket 164 and is seated within the latching recess 168 when the outer magazine cover is in the closed position (FIG. 7). In the illustrated embodiment, the latch member 170 is biased (e.g., via a spring) towards a closed or latched position. In order to move the inner magazine body 136 towards the open position, the latch member 170 is actuated, releasing the latching bracket 164 to permit the inner magazine body 136 to be extended from the outer magazine cover 132 towards the open position (FIG. 8). In the open position, the operator may load fasteners into the magazine 14.

Figure 9:
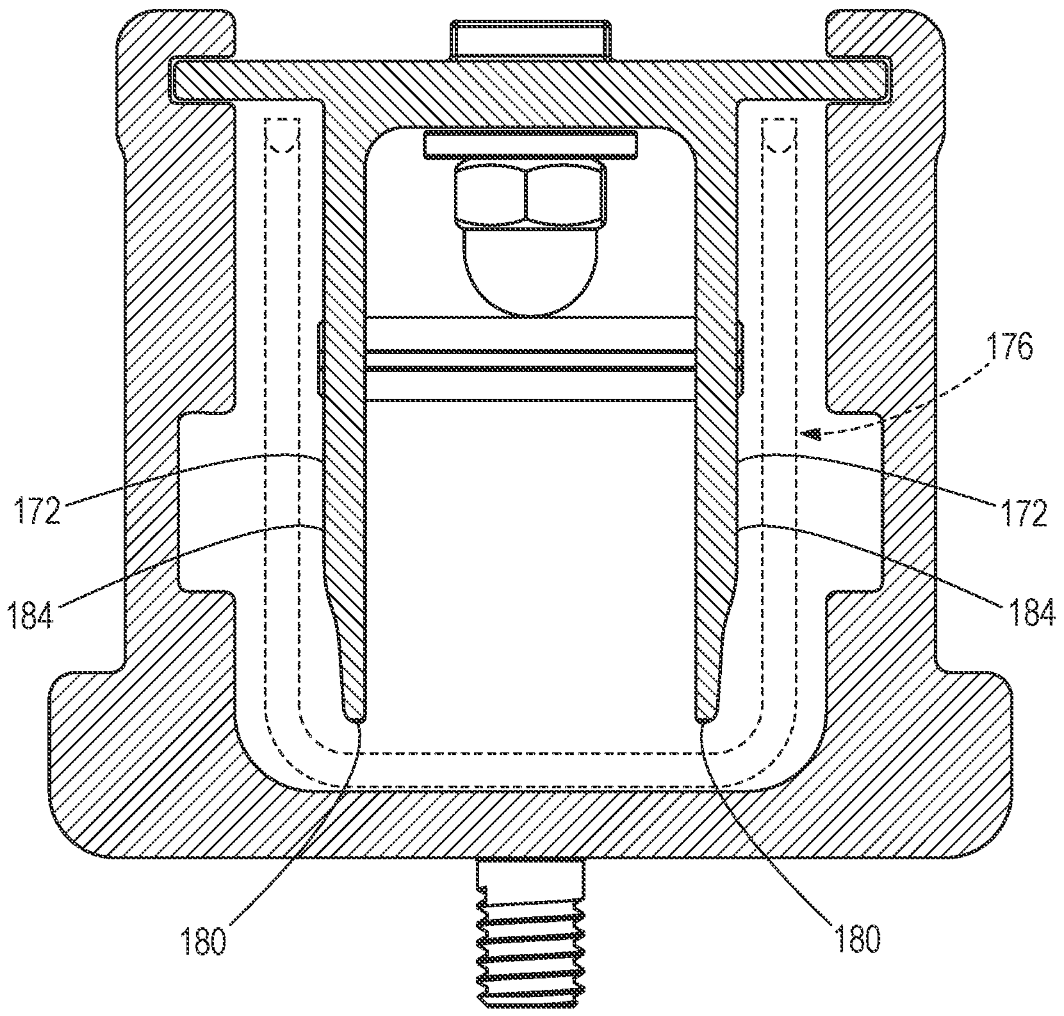
FIG. 9 is a cross-sectional view of the magazine of FIG. 7 along section line 7-7 in FIG. 7.
Figure 10:
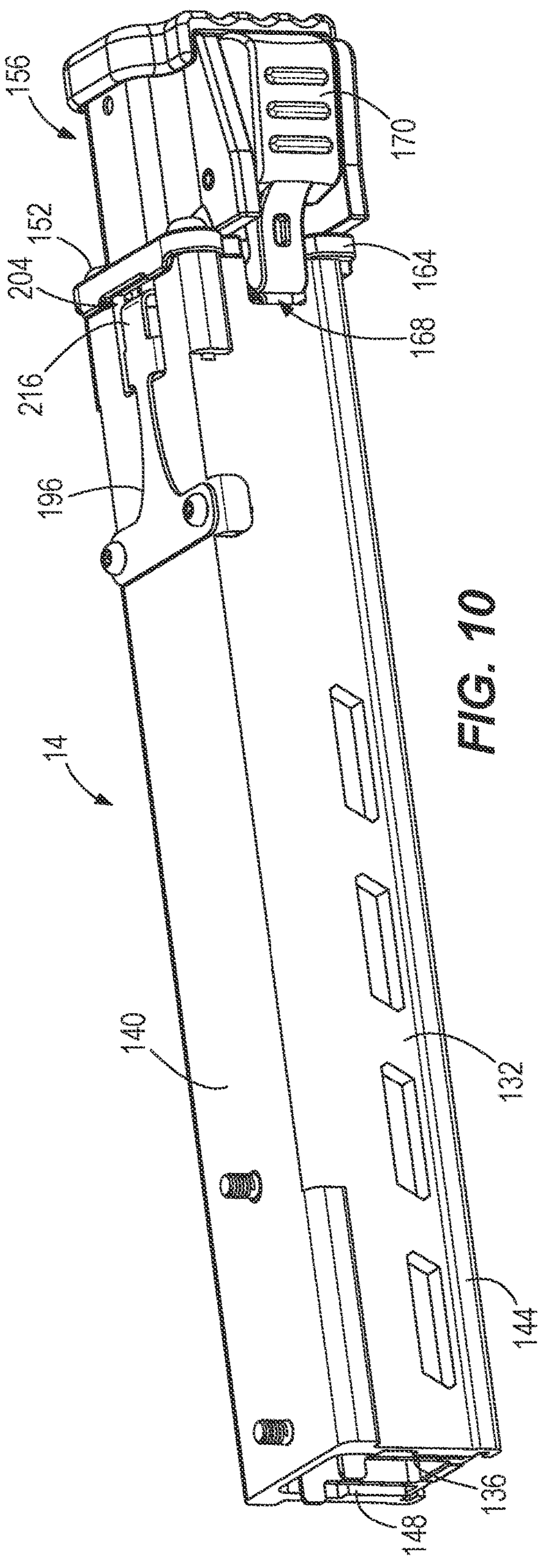
FIG. 10 is another perspective view of the magazine of FIG. 7, illustrating a pusher latch.

With reference to FIGS. 8 and 9, the inner magazine body 136 includes an extruded rail 172 defining the fastener channel 176 in which the staples 12 are received (FIG. 1). In the illustrated embodiment, the fastener channel 176 has a U-shape (represented by the broken lines in FIG. 9) corresponding to the U-shape of the staples 12. In the illustrated embodiment, the rail 172 is formed as two separate extrusions that define an edge portion 180 and two opposed sidewalls 184 adjacent the edge portion 180. Each of the staples 12 is configured to straddle the edge portion 180 and the sidewalls 184 of the rail 172 when the staples 12 are received in the fastener channel 176. In other embodiments, the extruded rail 172 may be formed as a single extruded structure. The outer magazine cover 132 further includes a pair of side surfaces 182 and a slot 186 recessed in the side surfaces 182. The slot 186 receives the inner magazine body 136 so the inner magazine body 136 can slide relative to the outer magazine cover 132.

Figure 11:
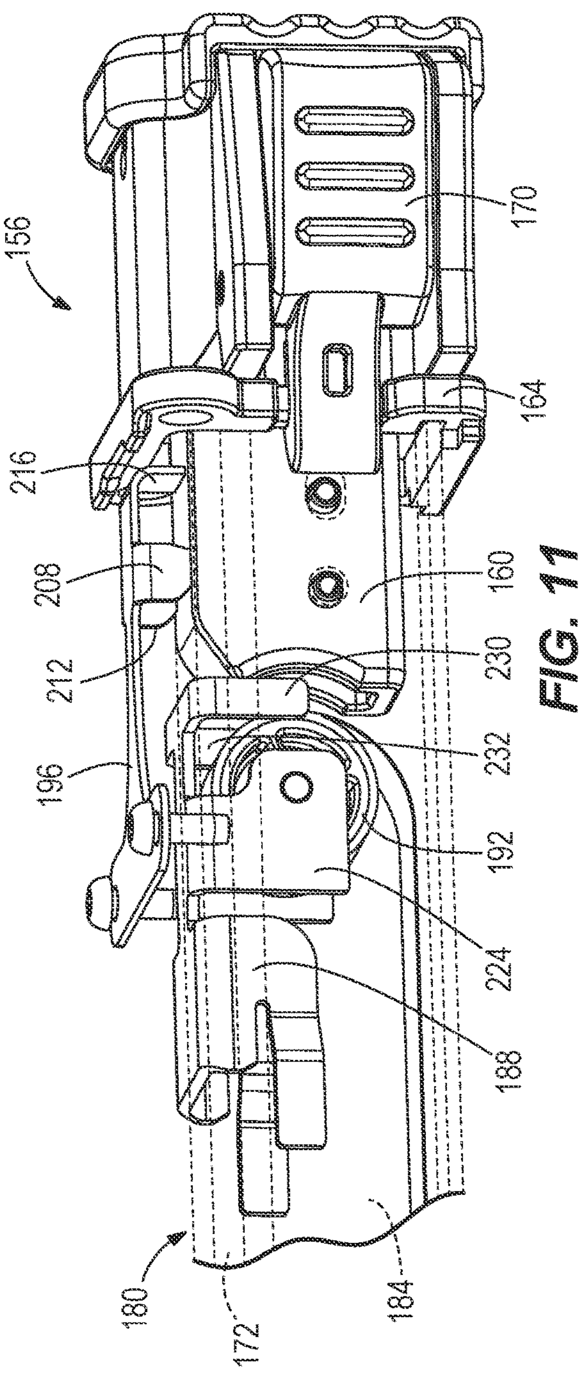
FIG. 11 is another perspective view the magazine of FIG. 7, with a portion of the magazine removed for clarity to illustrate the pusher latch and a pusher body.
Figure 12:
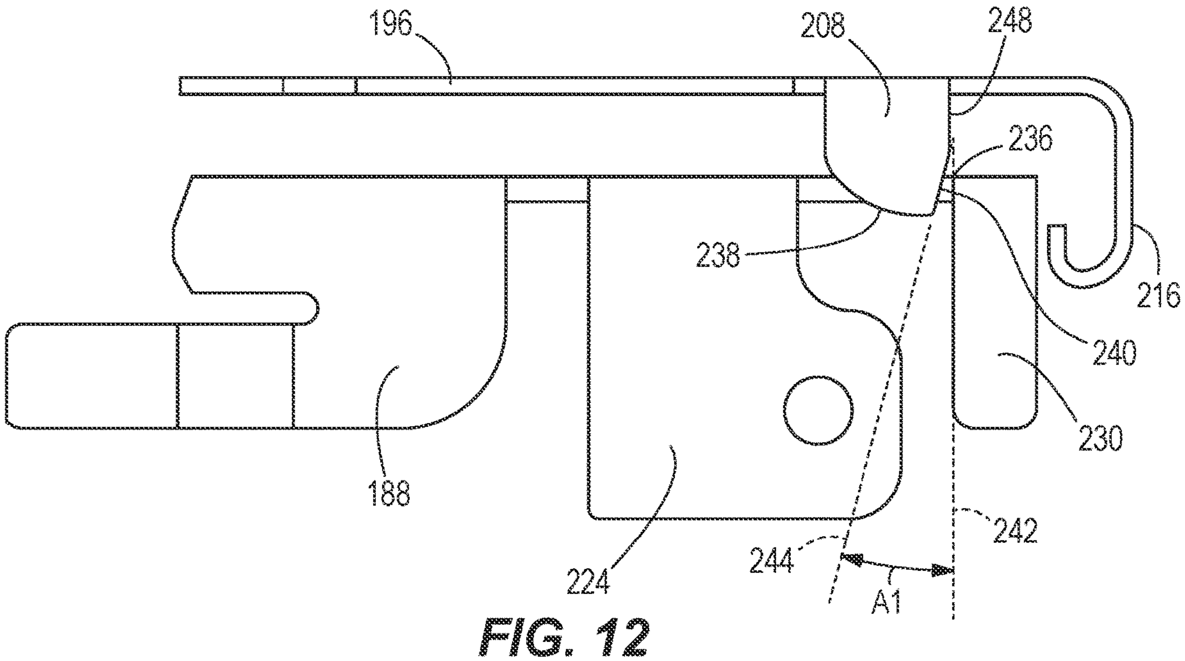
FIG. 12 is a side view of the pusher latch and pusher body.
Figure 13:
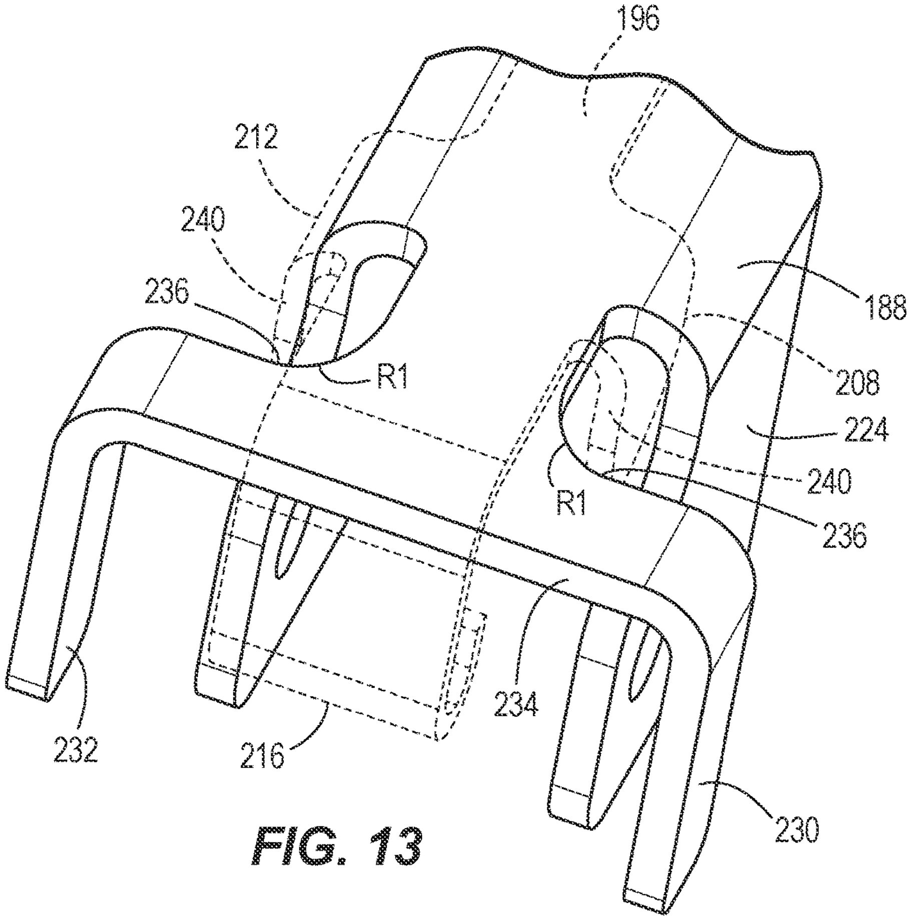
FIG. 13 is a top perspective view of the pusher latch and pusher body of FIG. 12.
Figure 14:
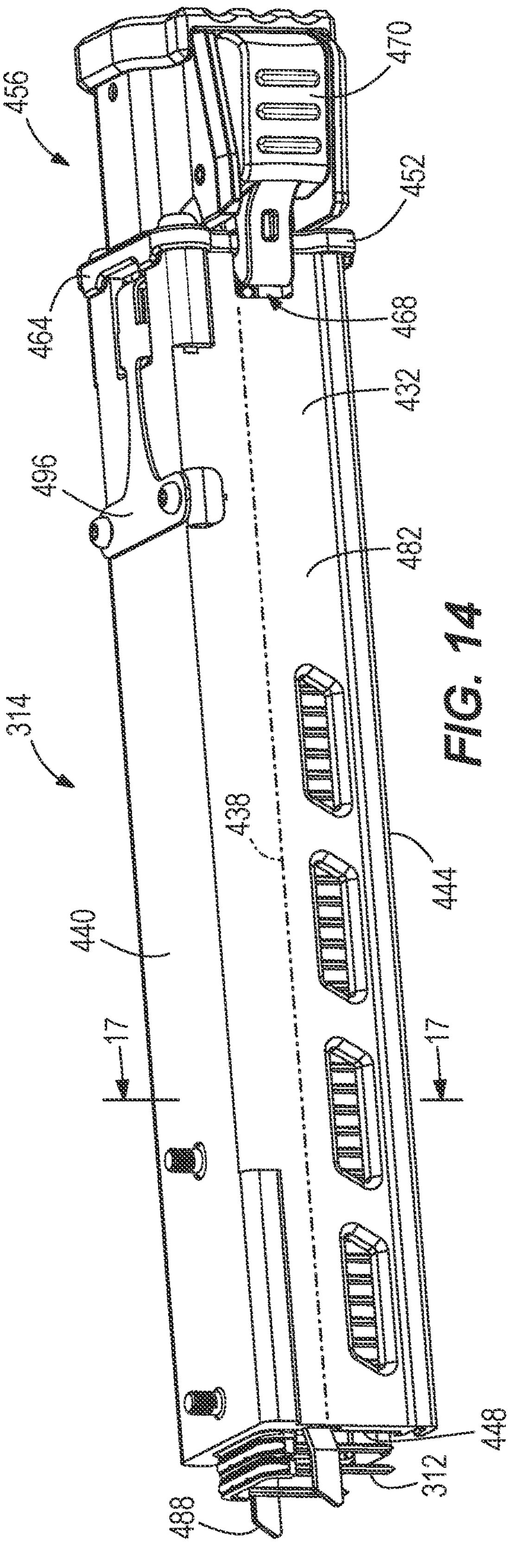
FIG. 14 is a top perspective view of another embodiment of a magazine for use with the powered fastener driver of FIG. 1, illustrating the magazine in a closed position.

Now with reference to FIGS. 11-13, the magazine 14 further includes a pusher body 188 (FIGS. 12, and 13) positioned within the fastener channel 176 of the magazine 14 and a latch 196 (FIG. 11) coupled to the top surface 140 of the outer magazine cover 132. The pusher body 188 is slidably coupled to the magazine 14 and biases the collated fastener strip toward the front portion 148 of the magazine 14. In the illustrated embodiment, the magazine 14 includes a biasing member (e.g., roll coil spring 192; FIG. 12) configured to bias the pusher body 188 toward the front portion 148 of the magazine 14 (i.e., toward the nosepiece 18).

The latch 196 includes a latch projection 216 that is received within an opening 204 defined in the top surface 140 of the outer magazine cover 132 and first and second projections 208, 212 oriented on each side of the latch 196. The latch projection 216 is biased inward toward the flange portion 160 of the lock assembly 156 (e.g., downward from the frame of reference of FIG. 10) through the opening 204. The latch projections 216 each define a contact surface 240. The contact surface 240 defines a first plane 244 oriented at an oblique angle A1 relative to a vertical reference plane 242 that is perpendicular to the longitudinal axis 138 of the magazine 14. The opposing side of arms 208, 212 define arcuate segments 238 opposing the contact surface 240. In the illustrated embodiment, the angle A1 is an acute angle (e.g., less than 90 degrees). In some embodiments, the angle A1 is in a range from 10 degrees to 30 degrees. In some embodiments, the angle A1 is approximately 15 degrees.

The pusher body 188 is configured to straddle the edge portion 180 and the sidewalls 184 of the rail 172. The pusher body 220 defines a main body 224 that supports the biasing member 192 and first and second arm members 230, 232. Each arm member 230, 232 includes a contact surface 236 (FIG. 13) configured to contact the contact surface 240 (FIGS. 12 and 13) of the first and second projections 208, 212, respectively, of the latch 196. The pusher body 220 is selectively engageable with the latch 196 for maintaining the pusher body 220 in a latched position (e.g., for loading). In the illustrated embodiment, the contact surfaces 236 are each curvilinear and include a constant radius R1. As a result, a single line of contact (e.g., extending along the longitudinal axis 138 of the magazine 14) is formed between the contact surface 236 of the pusher body 188 (e.g., at the radius R1) and the contact surface 240 of the latch 196.

When the magazine 14 is moved towards a closed position, the pusher body 188 is automatically adjusted from the latched position to a released position by engagement between the flange portion 160 of the lock assembly 156 and the latch projection 216 of the latch 196 when the inner magazine body 136 is slid toward the closed position. For example, the translation of the flange portion 160 in the closing direction of the inner magazine body 136 causes the latch projection 216 to slide upward along an inclined face of the flange portion 160, which deflects the latch 196 upward (e.g. from the frame of reference of FIGS. 10 and 12). As a result, the contact surface 240 of the latch 196 is moved above the contact surface 236 of the pusher body 188, which releases the pusher body 188 to bias the collated strip of staples towards the nosepiece 18.

When the magazine is moved towards an open position, the user releases the lock assembly 156 and slides the inner magazine body 136 (FIG. 8) and the pusher body 188 relative to the outer magazine cover 132. The movement of the pusher body 188 causes the arcuate members 238 (FIG. 12) of the first and second arm members 230, 232 of the latch 196 to engage with the arm members 208, 212 of the pusher body 188, which causes the latch 196 to deflect upwards (with reference to FIG. 12) so the arm members 208, 212 of the latch 196 move beyond (e.g., underneath) the arm members 208, 212 of the pusher body 188. Once the arm members 208, 212 of the latch 196 are beyond the arm members 230, 232 of the pusher body 188, the latch 196 is urged towards the position shown in FIG. 12 (e.g. so the contact surfaces 236, 240 are adjacent each other). Once the user releases the inner magazine body 136, the biasing member 192 urges the pusher body 188 forward (e.g., towards the front portion 148 of the outer magazine cover 132), which causes the contact surface 236 of each arm member 230, 232 of the pusher body 188 to engage the contact surface 240 of the latch 196. Thereby, the pusher body 188 is maintained in the latched position against the bias of the biasing member 192. The user may now load fasteners into the fastener channel 176 of the magazine 14 in front of the pusher body 188. The user may then load the collated strip of staples 12 in the magazine 14 in front of the pusher body 188. To adjust the pusher body 188 from the latched state into the normal operating state, the user pushes the inner magazine body 136 towards the closed position (FIG. 7), which disengages the engagement between the contact surfaces 236, 240 as described above. As a result, the pusher body 188 is released and biases the collated strip of staples 12 towards the nosepiece 18.

FIGS. 14-17 illustrate a magazine 314 according to another embodiment of the invention. The magazine 314 is like the magazine 14 shown in FIGS. 7-11 and described above. Therefore, like features are identified with like reference numerals plus "300", and only the differences between the two will be discussed.

Figure 15:
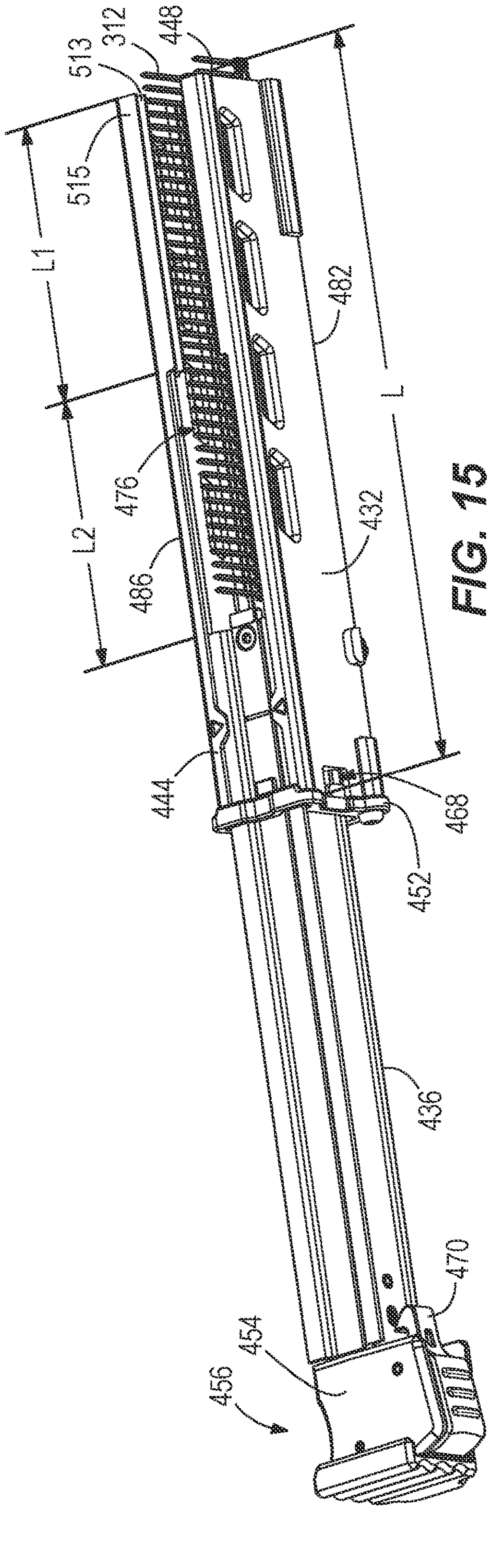
FIG. 15 is a bottom perspective view of the magazine of FIG. 14, illustrating the magazine in an open position.

The magazine 314 includes an outer magazine cover 432 and an inner magazine body 436 received within and slidable relative to the outer magazine cover 432 between a first closed position (FIG. 14) and a second, open position (FIG. 15). The outer magazine cover 432 includes a first, front end 448 adjacent the nosepiece 18 (FIG. 1), a second, rear end 452 adjacent the battery receptacle 34 (FIG. 1), and a length L extending along a longitudinal axis 438 between the front end 448 and the rear end 452. A lock assembly 456 is positioned at a rear end 454 of the inner magazine body 436 to selectively couple the inner magazine body 436 to the outer magazine cover 432 to maintain the inner magazine body 436 in the closed position. The magazine 314 further includes a pusher body 488 (FIG. 14) positioned within a fastener channel 476 (FIG. 17) of the magazine 314 and a latch 496 (FIG. 14) coupled to a top wall 440 of the outer magazine cover 432. The pusher body 488 is slidably coupled to the magazine body 436 and biases one or more collated fastener strips 312 toward the front end 448 of the magazine cover 432. The outer magazine cover 432 further includes a pair of parallel side walls 482 extending from opposite sides of the top wall 440 and a slot 486 within each of the side walls 482 in which the inner magazine body 436 is received so the inner magazine body 436 can slide relative to the outer magazine cover 432.

Figure 16:
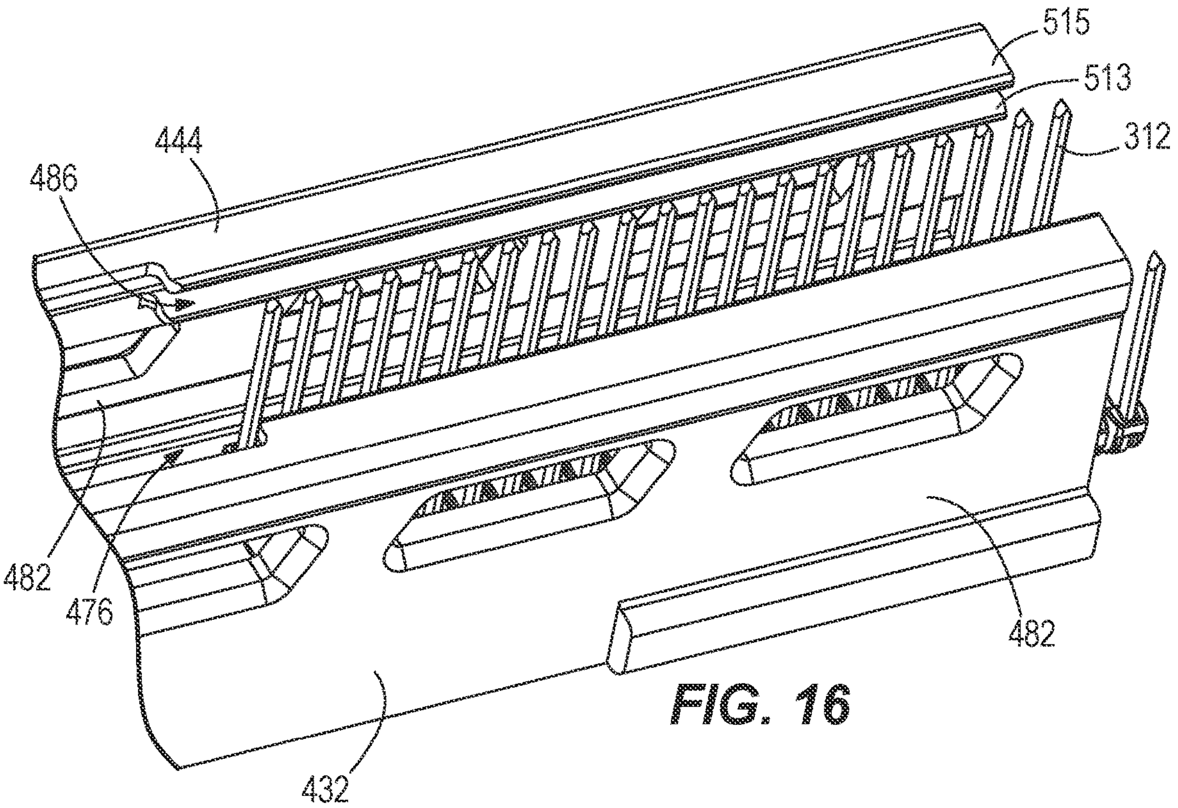
FIG. 16 is an enlarged, bottom perspective view of the magazine of FIG. 15.
Figure 17:
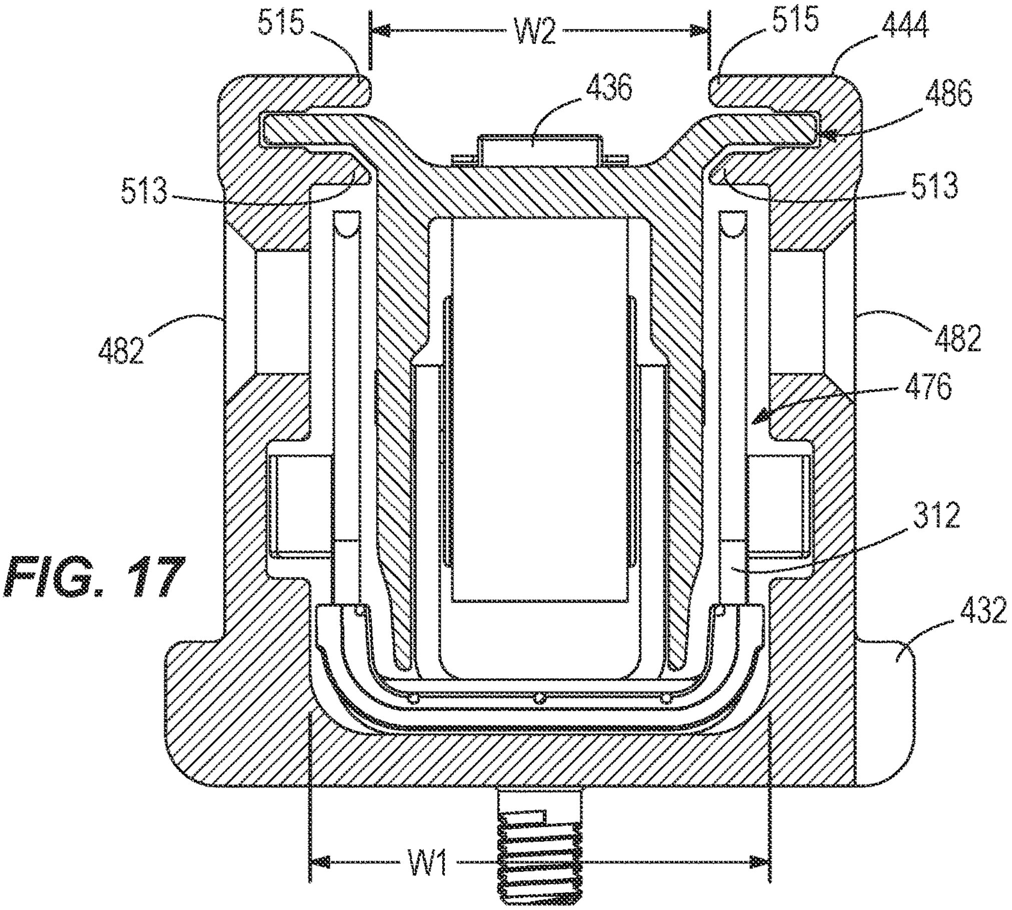
FIG. 17 is a cross-sectional view of the magazine of FIG. through section 16-16 in FIG. 14.

Now with reference to FIGS. 15-17, the outer magazine cover 432 includes an internal rib 513 and an external rib 515, which each extend inward from each of the side walls 482 of the outer magazine cover 432. The internal and external ribs 513, 515 are parallel and vertically spaced on each side of the slot 486 (FIG. 17). In the illustrated embodiment, the internal rib 513 and the external rib 515 each extend a length L1 (FIG. 15) of the outer magazine cover 432, which is a portion of the total length L of the outer magazine cover 432. The fastener channel 476 defines a width W1 that is sized receive the collated fastener strips 312 and the internal and external ribs 513, 515 define a gap therebetween having a width W2 that is less than the width W1 of the fastener channel 476 (FIG. 17). Therefore, the internal and external ribs 513, 515 reduce the width W2 of the opening formed at the bottom of the outer magazine cover 432 to restrict the collated fastener strips 312 from being removed from and/or installed into the fastener channel 476. In some embodiments of the magazine 314, the length L1 of the internal and external ribs 513, 515 may be equal to or greater than a length of a single collated fastener strip 312 to restrict removal of the collated fastener strip 312 when located within the length L1 of the magazine cover 432.

In the illustrated embodiment, the lengths L1 of the internal and external ribs 513, 515 are approximately equal. In other embodiments, the length of the external ribs 515 may be greater than or less than the length of the internal ribs 513. In other embodiments, the outer magazine cover 432 may only include one of either the internal ribs 513 or the outer ribs 515. While the illustrated internal and external ribs

513, 515 are continuous structures, it should be appreciated that the ribs may alternatively be segmented or discontinuous structures.

A second length L2 of the outer magazine cover 432 is devoid of the internal and external ribs 513, 515 and defines an installation region where the collation fastener strips 312 can be individually inserted when the magazine body 436 is in the open position (FIG. 15). The length L2 may be equal to or greater than the length of a single collated fastener strip 312, which requires the magazine body 436 to be fully retracted to its open position, thereby securing the pusher body 488 to the latch 496 as described above, prior to installation of a new collated fastener strip 312.

When the collated fastener strips 312 are inserted within the magazine 314, a first collated fastener strip 312 is inserted within the installation region of the outer magazine cover 432 and moved towards the front end 448 of the outer magazine cover 432. A second collated fastener strip 312 is then inserted within the installation region of the outer magazine cover 432. The inner magazine body 436 is moved towards the closed position (FIG. 14), which releases the pusher body 488 and biases the collated fastener strips 312 towards the nosepiece 18. As the pusher body 488 biases the collated fastener strips 312, the internal ribs 513 supports the tips of the collated fastener strips 312. The inner ribs 513 prevent the adjacent strips 312 from buckling, ensures proper alignment of the fastener strips 312 within the magazine 314, and supports the tips of the fastener strips 312 when the fasteners are sequentially fed from the magazine 14 into the nosepiece 18 (FIG. 1) prior to each fastener-driving operation.

Figure 19:
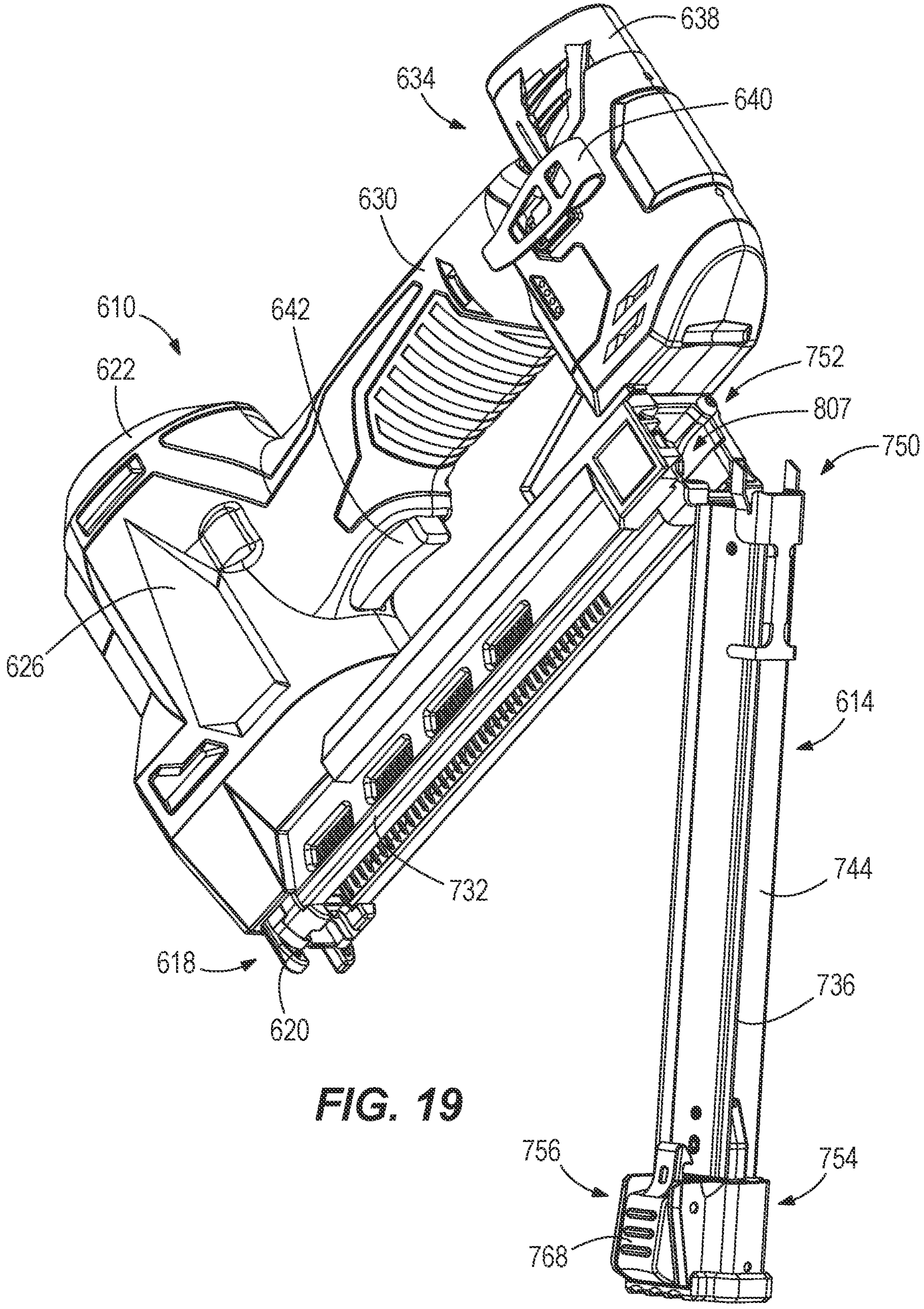
FIG. 19 is a bottom perspective view of the powered fastener driver of FIG. 18 with the magazine in an open position.
Figures 20, 21:
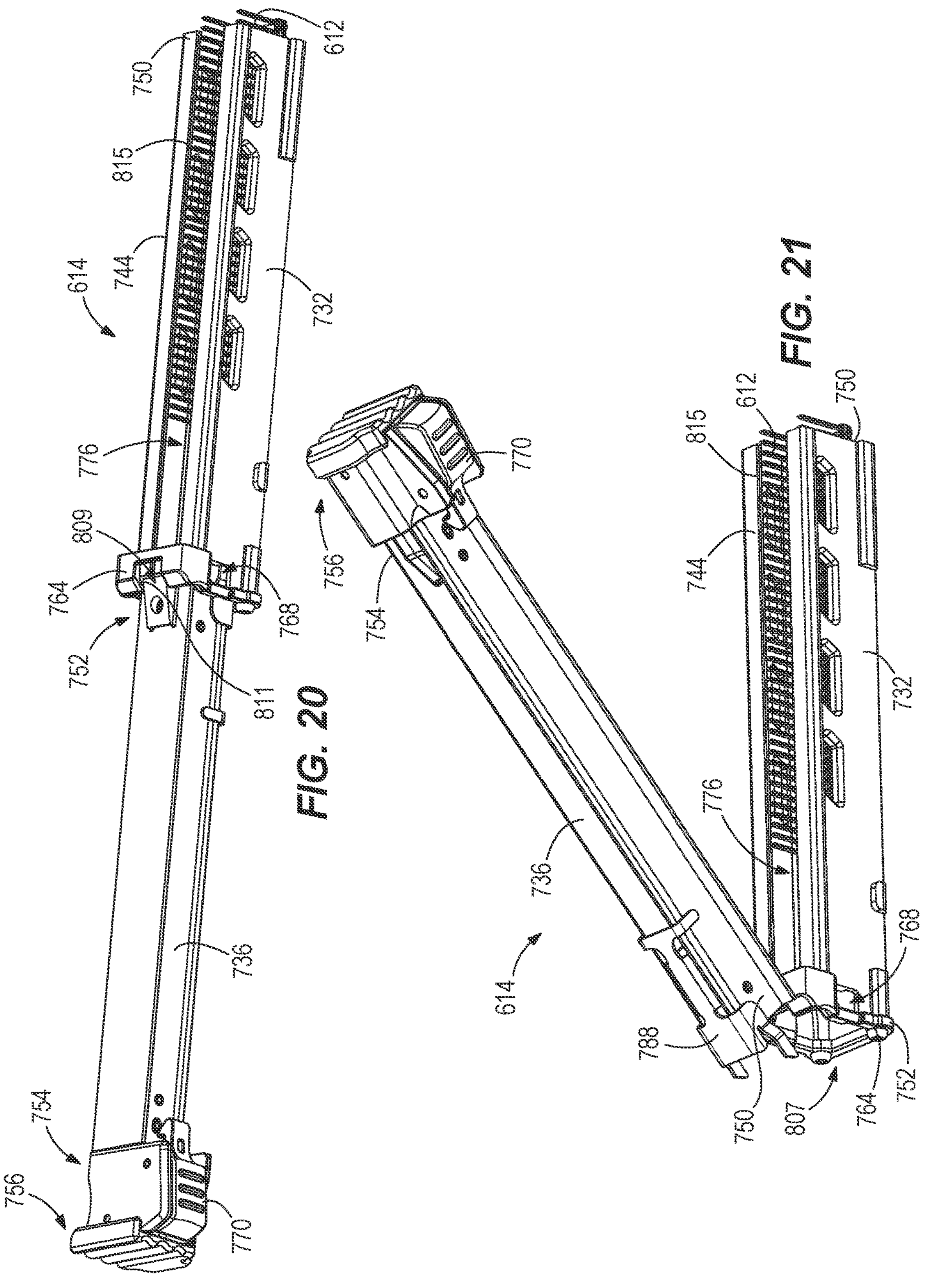
FIG. 20 is a bottom perspective view of the magazine of FIG. 18, illustrating the magazine in a partially open, intermediate position.
FIG. 21 is a bottom perspective view of the magazine of FIG. 18, illustrating the magazine in a fully open position.

The magazine 614 includes an outer magazine cover 732 and an inner magazine body 736 received within the outer magazine cover 732. The inner magazine body 736 is movable between a first closed position (FIG. 18), a second, intermediate position (FIG. 20), and a third, open position (FIGS. 19 and 21). The outer magazine cover 732 includes a first, front end 748 adjacent a nosepiece 618, second, rear end 752 adjacent the battery receptacle 634. The inner magazine body 736 includes a front end 750 and a rear end 754 opposite the front end 748. In the open position, collated fastener strips 312 can be inserted through an installation region 807 formed in the rear end 752 of the outer magazine cover 732. The magazine 614 further includes a pusher body 788 (FIG. 21) positioned within a fastener channel 776 of the magazine 614, which is slidably coupled to the magazine body 736 and biases collated fastener strips 612 toward a front end 748 of the magazine cover 732.

Figure 18:
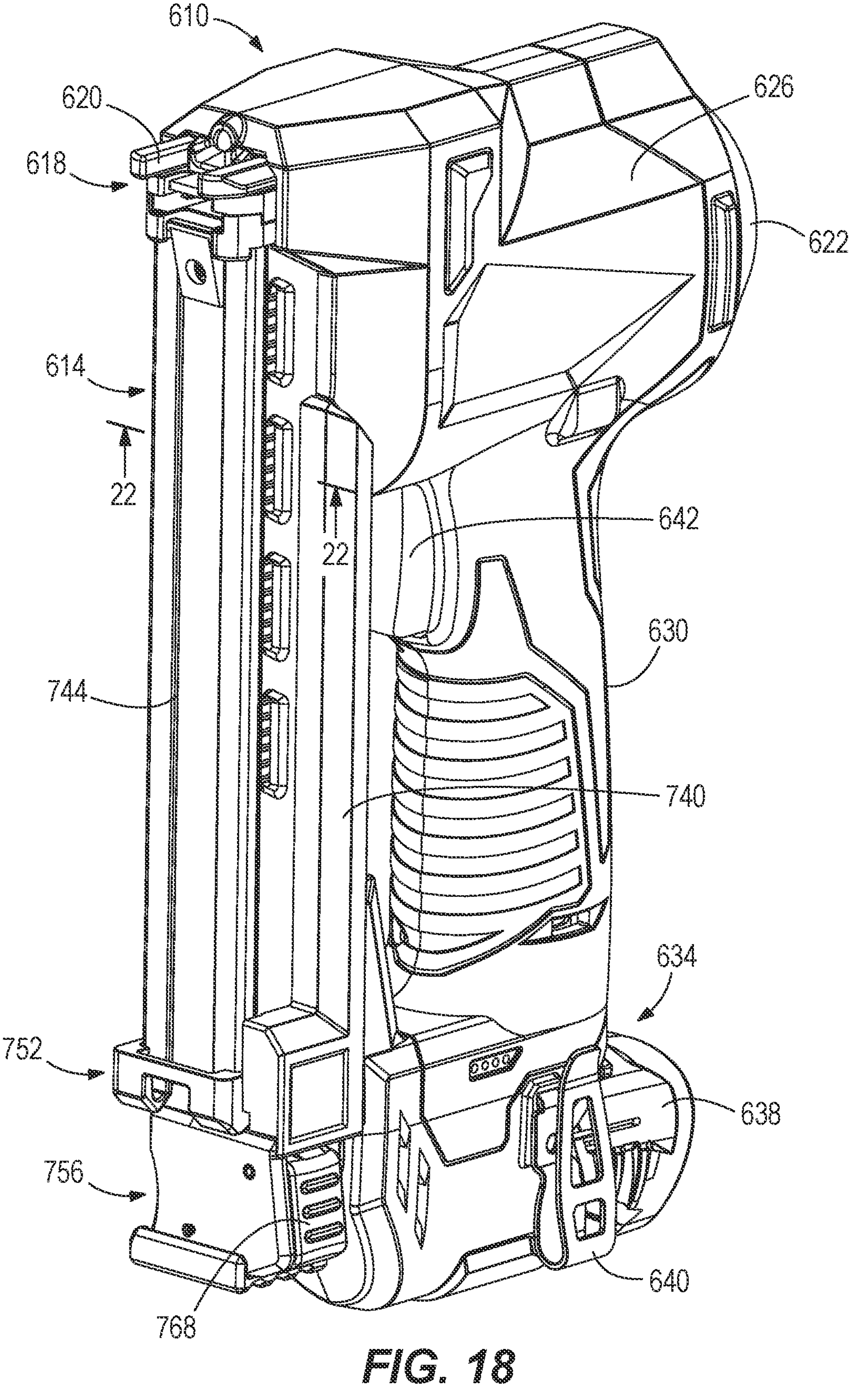
FIG. 18 is a bottom perspective view of a powered fastener driver including another embodiment of a magazine in a closed position.

A lock assembly 756 is positioned at a rear end 754 of the inner magazine body 736 to selectively couple the inner magazine body 736 to the outer magazine cover 732 to maintain the inner magazine body 736 in the closed position (FIG. 18). The lock assembly 756 includes a latch member 770 that selectively engages the latching bracket 764 and is seated within the latching recess 768 when the outer magazine cover 732 is in the closed position (FIG. 18). The latching bracket 764 further defines a recess 809 that is sized to receive a protrusion 811 formed on the inner magazine body 736 when the magazine 614 is in the second, intermediate position (FIG. 20).

Figure 22:
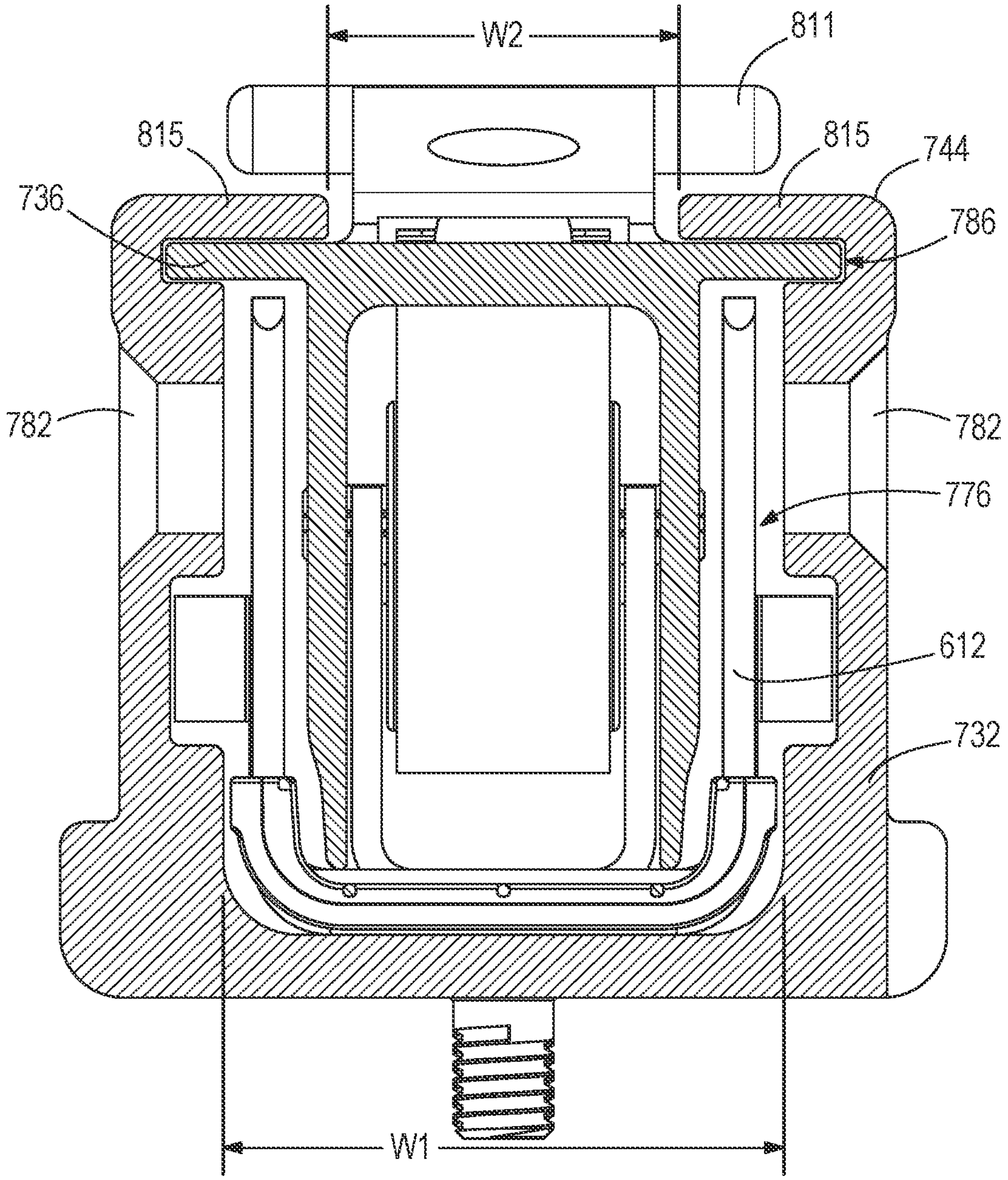
FIG. 22 is a cross-sectional view of the magazine of FIG. 18 through section 22-22 in FIG. 18.

Now with reference to FIGS. 20-22, the outer magazine cover 732 includes a rib 815 that extends inward from each of the side walls 782 of the outer magazine cover 732. The fastener channel 776 defines a width W1 (FIG. 22) that is sized receive the collated fastener strips 612 and the ribs 815 define a gap therebetween having a width W2 that is less than the width W1 of the fastener channel 776. Therefore, the ribs 815 prevent installation of the collated fastener strips 612 through the bottom of the outer magazine cover 732, thus requiring the collated fastener strips 612 to be installed through the installation region 807 at the rear end 752 of the magazine cover 732.

To insert a collated fastener strip 612 into the magazine 614, the latch member 770 of the lock assembly 756 is actuated to permit slidable movement of the inner magazine body 736 relative to the outer magazine cover 732. Once the inner magazine body 736 reaches the second, intermediate position (FIG. 20), the protrusion 811 on the inner magazine body 736 engages the recess 809 formed in the latching bracket 764 so the inner magazine body 736 can pivot relative to the outer magazine cover 732 towards the third, open position (FIG. 21). In the open position, the collated fastener strips 612 can be inserted within the magazine 614 through the installation region 807 formed in the rear end 752 of the outer magazine cover 732 and moved towards the front portion 748 of the outer magazine cover 732. Once the collated fastener strips 612 are inserted within the outer magazine cover 732, the inner magazine body 736 is pivoted back to the second, intermediate position and then is slidably moved towards the closed position (FIG. 18), which releases the pusher body 788 as described above and biases the collated fastener strips 612 towards the nosepiece 618.

Figure 23:
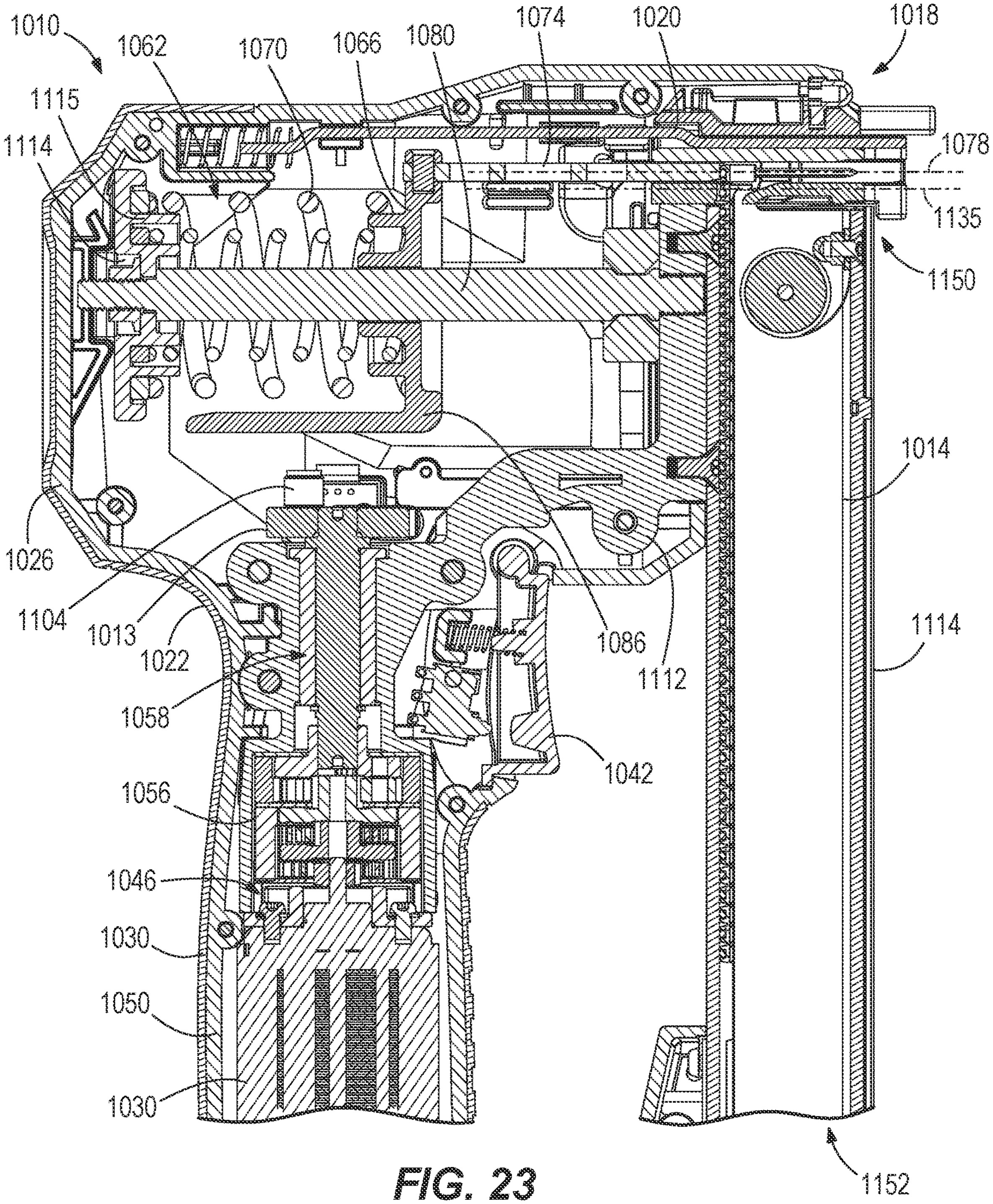
FIG. 23 is a cross-sectional view of a powered fastener driver according to another embodiment, illustrating a drive mechanism, a firing mechanism, and a lifter assembly.

FIG. 23 illustrates a power fastener driver 1010 according to another embodiment of the invention. The power fastener driver 1010 is like the power fastener driver 10 shown in FIGS. 1-13 and described above. Therefore, like features are identified with like reference numerals plus "1000", and only the differences between the two will be discussed.

The powered fastener driver 1010 (e.g., a cable stapler) includes a magazine 1014 that holds fasteners 1012 (e.g., staples of a staple collation) and a nosepiece 1018 that sequentially receives the fasteners 1012 from the magazine 1014 prior to each fastener-driving operation. The driver 1010 includes a trigger 1042 that selectively activates a drive mechanism 1046 enclosed within a handle portion 1030 of the driver 1010. The drive mechanism 1046 includes an electric motor 1050 and a gear box 1054 that receives torque from the motor 1050. A lifter assembly 1058 is coupled to the drive mechanism 1046 and is positioned between the drive mechanism 1046 and a firing mechanism 1062.

The firing mechanism 1062 includes a movable member (e.g., a piston 1066) for reciprocal movement within the head portion 1026, a biasing member (e.g., a compression spring 1070) seated against the piston 1066, and a driver blade 1074 attached to the piston 1066. The biasing member 1070, 1072 urges the piston 1066 and the driver blade 1074 within the head portion 1026 towards a driven or bottom-dead center (BDC) position to drive the fastener 1012 into the workpiece.

The lifter assembly 1058 is operated by the drive mechanism 1046 to return the piston 1066 and the driver blade 1074 towards a top-dead center (TDC) position, against the bias of the biasing member 1070, 1072. In the illustrated embodiment, the biasing member includes a nested pair of compression springs 1070, 1072 that act in unison to urge the piston 1066 and the driver blade 1074 towards the BDC position. The compression springs 1070, 1072 include a first end supported within the piston 1066 and a second end supported within an end cap 1114. The end cap 1114 includes a first, outer recess 1117 and a second, inner recess 1119 that is surrounded by the first recess 1117. A first, outer washer 1121 is supported within the first recess 1117 formed in the end cap 1114. A second, inner washer 1123 is supported within the second recess 1119 formed in the end cap 1114. The end cap 1114 further includes an outer spring sleeve 1125 that retains the first washer 1123 within the end cap 1114. The first washer 1123 is positioned between the second end of the first compression spring 1070 and the end cap 1114. The second washer 1125 is positioned between the second end of the second compression spring 1072 and the end cap 1114. In the illustrated embodiment, the spring sleeve 1125 is formed of a metallic material (e.g., steel) and the washers 1121, 1123 are formed of a plastic material. The spring sleeve 1123 reduces deformation of the outer washer 1117 and helps maintain the shape of the washer 1117.

Further, the compression springs 1070, 1072 are formed of a metallic material such as 55CrSi. The first, outer compression spring 1070 has a first wire thickness T1 and the second, inner compression spring has a second wire thickness T2 that is less than the first wire thickness T1. The outer compression spring 1070 includes an outer nominal diameter of 40 millimeters, an uncompressed length of 93 millimeters, and a stiffness of 8.7 N/mm. In some embodiments, the outer nominal diameter of the outer compression spring 1070 may be in a range from 30 millimeters to 50 millimeters. In some embodiments, the stiffness of the outer compression spring 1070 may be in a range from 8.0 N/mm to 10 N/mm. The inner compression spring 1072 includes an outer nominal diameter of 25 mm, an uncompressed length of 93 millimeters, and a stiffness of 4.35 N/mm. In some embodiments, the outer nominal diameter of the inner compression spring 1072 may be in a range from 30 millimeters to 50 millimeters. In some embodiments, the stiffness of the inner compression spring 1072 may be in a range from 3.0 N/mm to 6.0 N/mm. In some embodiments, the uncompressed length of the inner and outer compression springs 1070, 1072 may be in a range from 70 millimeters to 110 millimeters.

Figure 25:
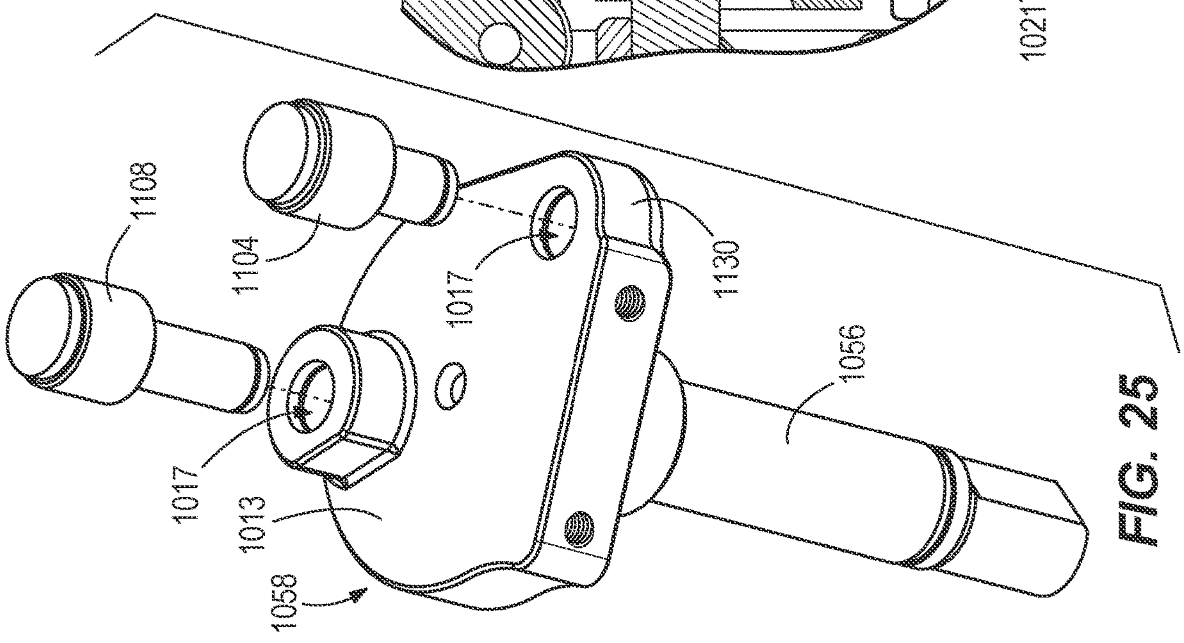
FIG. 25 is a perspective view of the lifter assembly of the power fastener driver of FIG. 23.

As shown in FIG. 25, the lifter assembly 1058 is formed as a unitary body having an input shaft 1056, which may also be considered an output shaft of the gear box 1054, and a hub 1013 that selectively engages a portion of the firing mechanism 1062 to return the piston 1066 and the driver blade 1074 towards the TDC position. In the TDC position, the compression springs 1070, 1072 store at least 14.5 Joules (J) of potential energy, which provides sufficient energy to fully seat fasteners into a workpiece. The fastener driver 1010 is able to store at least 14.5 J of potential energy, with an overall length L defined between a front end of driver 1010 (e.g., a front end of the contact trip 1020) and a rear end of the housing 1022 (e.g., the head portion 1026) of 18 centimeters or less, and in some embodiments 16.5 centimeters or less, because of the nested springs 1070, 1072 acting on the piston 1066. By nesting dual springs 1070, 1072 having different stiffnesses, more potential energy can be stored in the driver 1010 compared to a single spring within the same spatial confines. In other words, to achieve an equivalent potential energy with a single compression spring, such a spring would necessarily require a longer uncompressed length to accommodate a greater amount of compression, which then requires the driver to have a greater overall length (i.e., greater than 18 centimeters). With an overall length of 18 centimeters or less, the driver 1010 can be used in more confined spaces compared to prior art fastener drivers with an overall length of greater than 18 centimeters.

Figure 24:
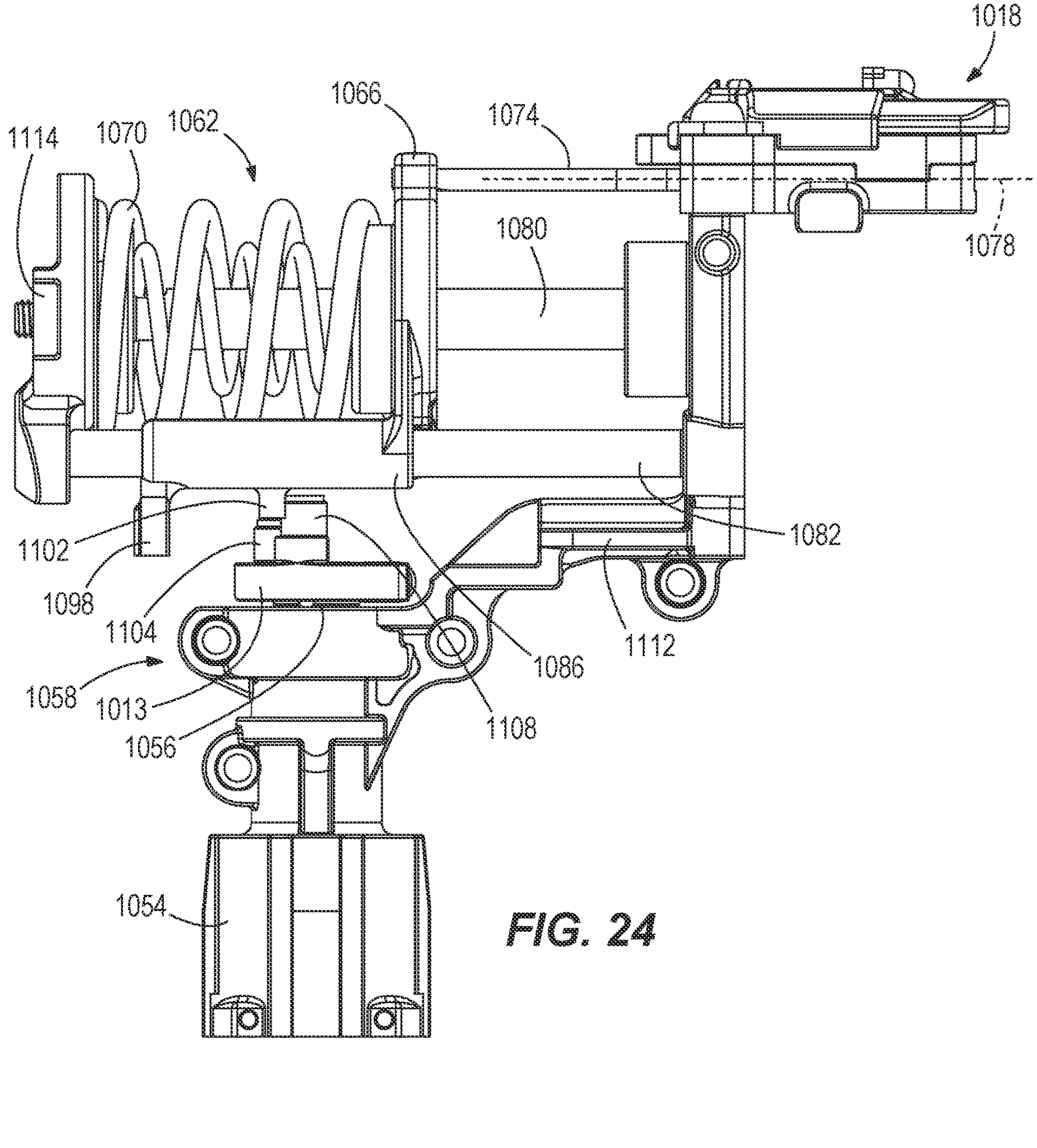
FIG. 24 is a side view of the drive mechanism, the firing mechanism, and the lifter assembly of the powered fastener driver of FIG. 23.

For example, the hub 1013 may include eccentric pins 1104, 1008 that engage respective first and second protrusions 1098, 1102 (FIG. 24) of the firing mechanism, which return the piston 1066 and the driver blade 1074 from the BDC position toward the TDC position. In the illustrated embodiment, the eccentric pins 1104, 1108 are secured within recesses 1017 (FIG. 25) formed in the hub 1013 of the lifter assembly 1058. In other embodiments, the eccentric pins 1104, 1108 may be integrally formed with the hub 1013.

The unitary construction of the lifter assembly 1058 increases performance and durability of the lifter assembly 1058 by reducing the number of separate assembled parts in the lifter assembly 1058. In the illustrated embodiment, the lifter assembly 1058 is formed by forging a piece of raw material (e.g., steel, aluminum, etc.) into the desired form. The recesses 1017 may be formed by machining the lifter assembly 1058 after the forging process is completed. In other embodiments, the eccentric pins 1104, 1108 may also be formed as part of the unitary body of the lifter assembly 1058 during the forging process.

Figure 26:
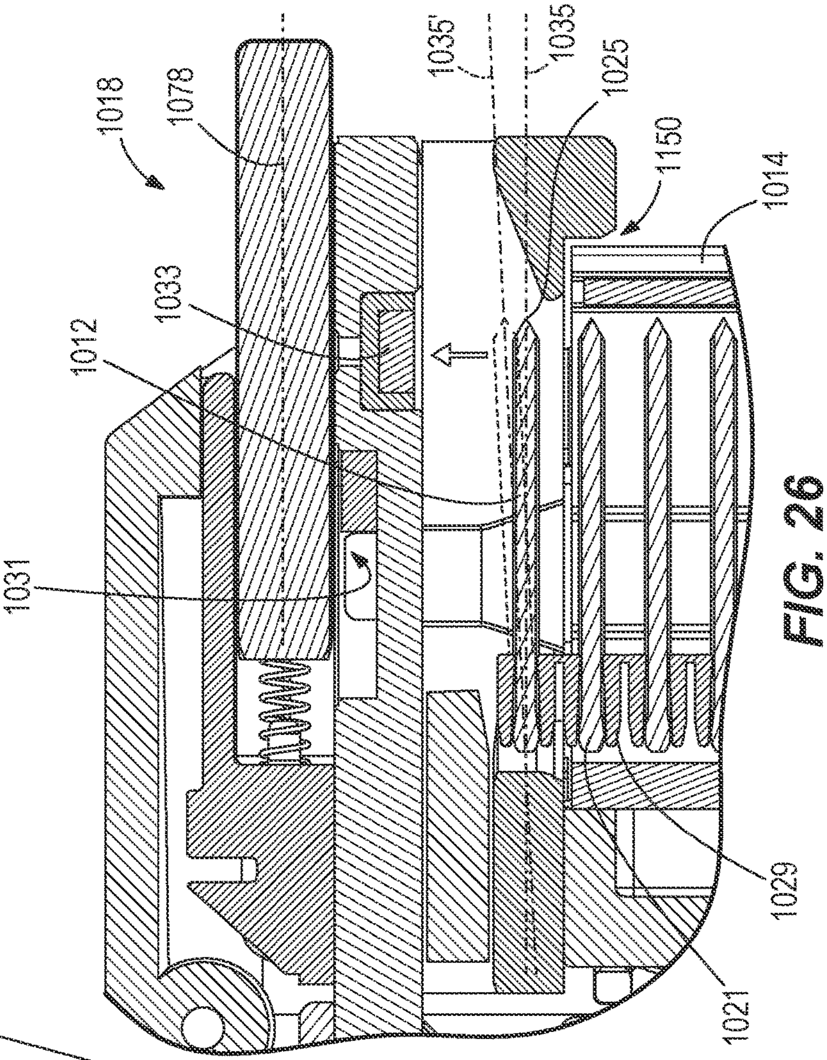
FIG. 26 is a cross-sectional view of a portion of the power fastener driver of FIG. 23, illustrating a fastener alignment mechanism.

Now with reference to FIG. 26, the magazine 1014 is sized to receive a collated fastener strip having a plurality of fasteners 1012. Each of the fasteners 1012 includes a crown section 1021 and a tip 1025 opposing the crown section 1021. The fasteners 1012 are held in the collated fastener strip by collation tabs 1029 interconnecting the crown sections 1021 of the fasteners 1012. The nosepiece 1018 defines a fastener driving channel 1031 from which consecutive fasteners 1012 provided from the magazine 1014 are driven during each fastener driving operation.

The powered fastener driver 1010 may include a fastener alignment mechanism that urges the fastener 1012 adjacent the fastener driving channel 1031 of the nosepiece 1018 towards a loading position. In the illustrated embodiment, the alignment mechanism may include a magnetic element 1033 positioned adjacent a first, front portion 1150 of the magazine 1014 and the nosepiece 1018 of the driver 1010. In the illustrated embodiment, the magnetic element 1033 is positioned proximate a tip 1025 of the fastener 1012 adjacent the fastener driving channel 1031 of the nosepiece 1018. The magnetic element 1033 produces a magnetic force that interacts with and urges the tip 1025 of the fastener 1012 upwards from the frame of reference of FIG. 26 (i.e., towards the nosepiece 1018). The use of the magnetic element 1033 aligns the fastener 1012 with the fastener driving channel 1031 without increasing resistance during the fastener driving operation. In other embodiments, the magnetic element 1033 may be positioned adjacent other sections of the fastener 1012. Additionally, or alternatively, one or more magnetic elements 1033 may be used to ensure alignment and upward bias of the fastener 1012.

During a fastener driving event, the collation tab 1029 of the fastener 1012 positioned adjacent the fastener driving channel 1031 may break off from the adjacent collation tab, which may cause rotation of the fastener 1012. The magnetic force provided by the magnetic element 1033 counteracts the rotation caused during the breaking process of the collation tab 1029 to resist over-rotation of the fastener 1012 within the magazine 1014 (e.g., beyond the loading position) and ensures proper alignment between the fastener 1012 and the fastener driving channel 1031 prior to the fastener 1012 entering the channel 1031. In the illustrated embodiment, a fastener axis 1035 extends centrally through the fastener 1012. When the fastener 1012 is in the loading position (illustrated by a broken line outline of the fastener 1012), the tip 1025 of the fastener 1012 may be urged upwards (e.g., to pre-tilt the fastener 1012) by the magnetic element 1033, which causes a fastener axis 1035' to be non-parallel with a drive axis 1078 defined by the driver blade 1074. As the collation tab 1029 breaks, the fastener 1012 is rotated to realign the fastener axis 1035' with the fastener axis 1035 to become parallel with the drive axis 1078 defined by the driver blade 1074.

Figure 27:
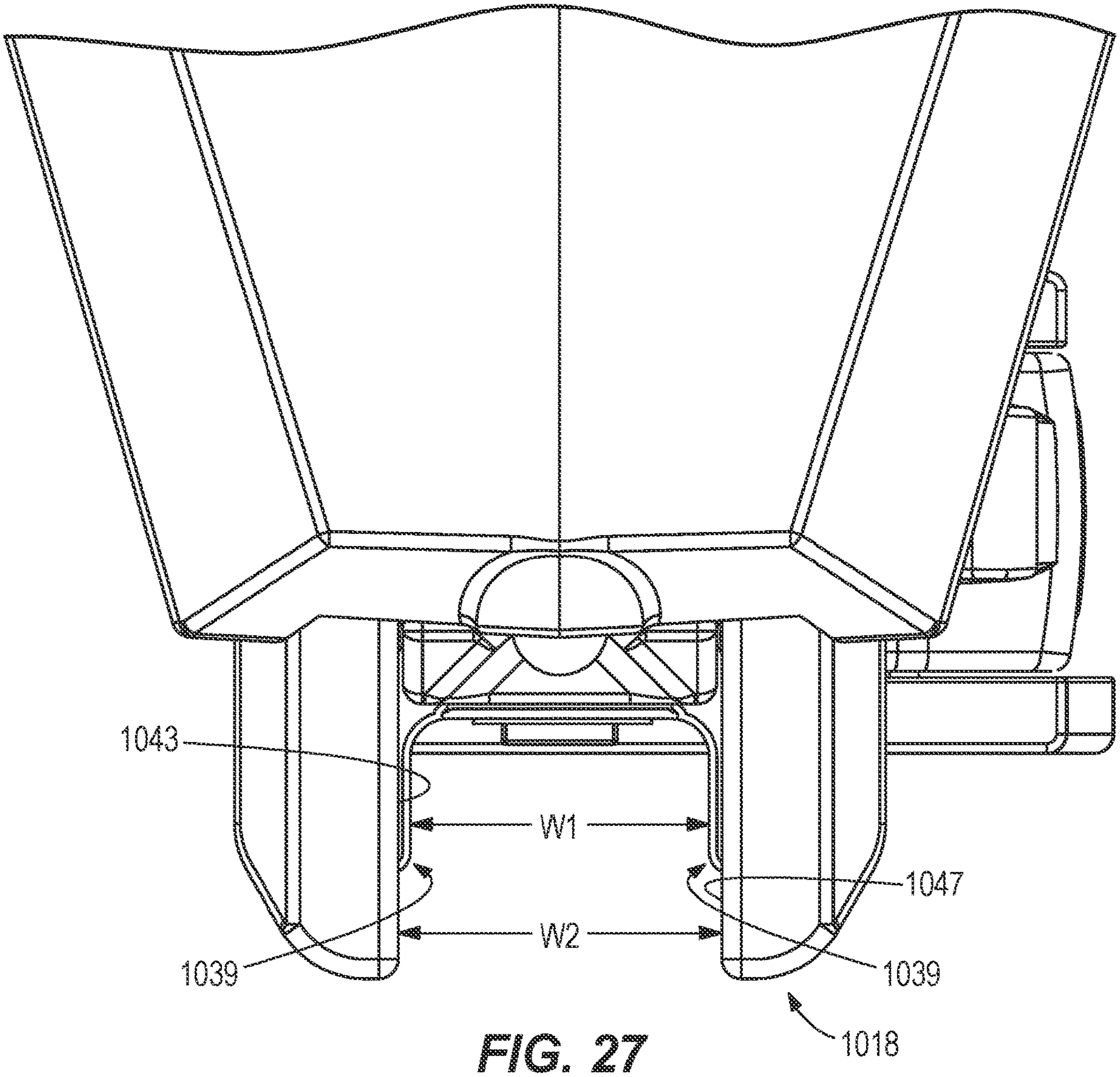
FIG. 27 is a front view of a portion of the power fastener driver of FIG. 23, illustrating the nosepiece of the power fastener driver.

Now with reference to FIG. 27, the nosepiece 1018 of the powered fastener driver 1010 includes an interior surface 1039 sized to receive a cable being secured to a workpiece during a fastener driving operation. In the illustrated embodiment, the interior surface 1039 includes a first portion 1043 having a first width W1 and a second portion 1047 having a second width W2 that is greater than the first width W1. In other words, the interior surface 1039 is stepped to accommodate different diameter cables during the fastener driving operation. In some embodiments, the second portion 1047 may be movable relative to the first portion 1043 to adjust the width of the second portion 1047 of the nosepiece 1018 to accommodate larger diameter cables. In the illustrated embodiment, the first portion of the nosepiece has a width of 15.5 millimeters and the second portion of the nosepiece has a width of 16.5 millimeters.

FIGS. 28-41 illustrate a powered fastener driver 1210 according to another embodiment of the invention. The powered fastener driver 1210 is like the powered fastener driver 10 shown in FIGS. 1-17 and described above. Therefore, like features are identified with like reference numerals plus "1200", and only the differences between the two will be discussed.

Figure 28:
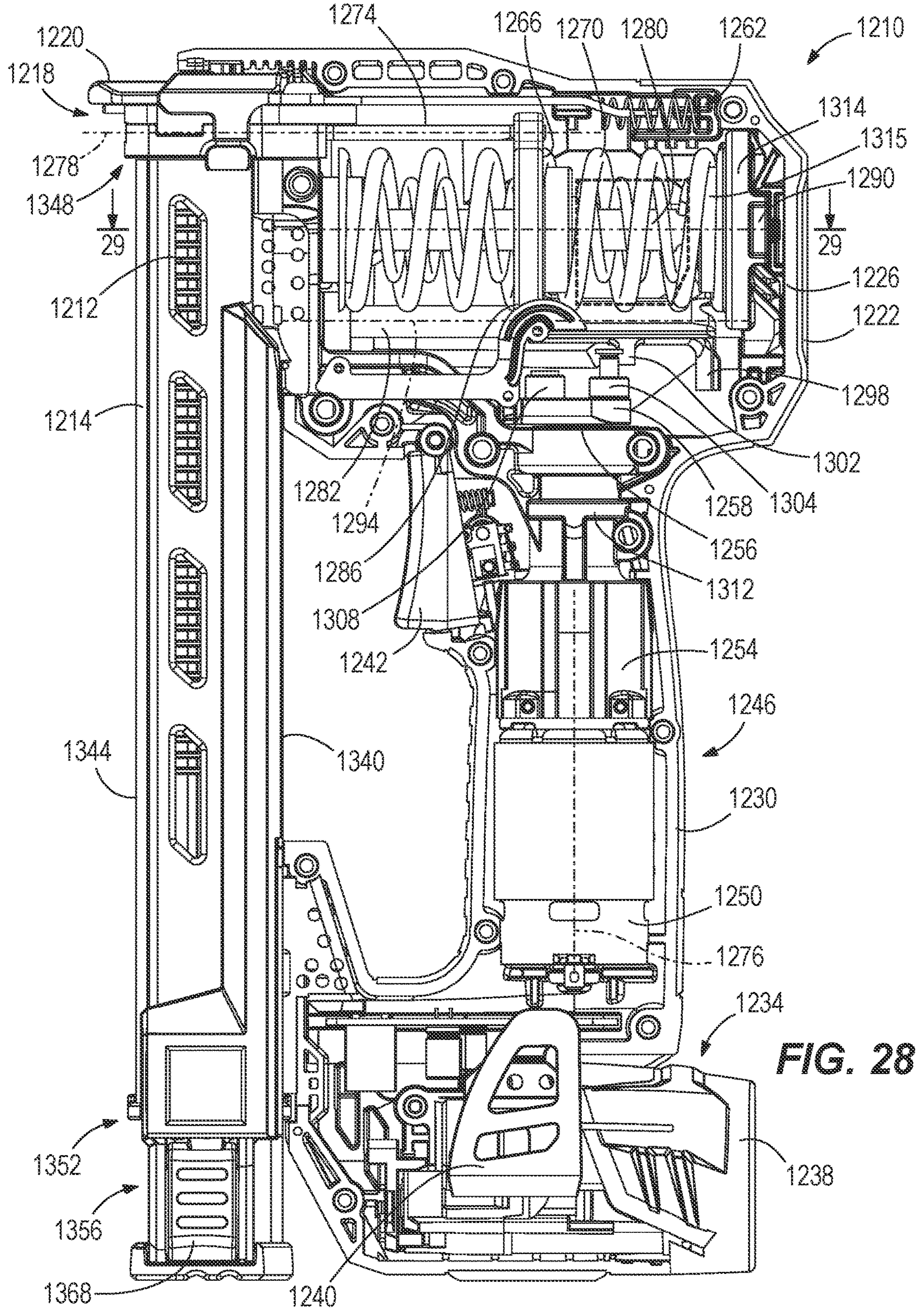
FIG. 28 is a side view of a powered fastener driver according to another embodiment, with portions removed for clarity, illustrating a drive mechanism, a firing mechanism, and a lifter assembly.

FIG. 28 illustrates a powered fastener driver 1210 (e.g., a cable stapler) for driving fasteners 1212 (e.g., staples of a staple collation) held within a magazine 1214 into a workpiece. The driver 1210 includes a nosepiece 1218 that sequentially receives the fasteners from the magazine 1214 prior to each fastener-driving operation. The nosepiece 1218 includes a contact trip 1220 that allows the driver 1210 to be operated in a single shot mode and/or a bump or continuous shot mode. The driver 1210 includes a housing 1222 defining a head portion 1226, a handle portion 1230, and a battery receptacle portion 1234 that receives a battery pack 1238. In the illustrated embodiment, the housing 1222 is longitudinally split at a parting line 1224 into first and second housing portions 1222*a*, 1222*b*. The driver 1210 includes a trigger 1242 that selectively provides power to a drive mechanism 1246 enclosed within the handle portion 1230 of the driver 1210. The drive mechanism 1246 includes an electric motor 1250, a gear box 1254 that receives torque from the motor 1250, and an output shaft 1256 driven by the gear box 1254.

The powered fastener driver 1210 includes a firing mechanism 1262 supported within the head portion 1226 of the housing 1222. The firing mechanism 1262 is coupled to the drive mechanism 1246 and is operable to perform a fastener driving operation. The firing mechanism 1262 includes a movable member (e.g., a piston 1266) for reciprocal movement within the head portion 1226, a biasing member (e.g., one or more compression springs 1270, 1272) seated against the piston 1266, and a driver blade 1274 attached to the piston 1266 (FIG. 28). The biasing members 1270, 1272 urge the piston 1266 and the driver blade 1274 within the head portion 1226 towards a driven or bottom-dead center (BDC) position to drive the fastener 1212 into the workpiece. In the illustrated embodiment, the biasing member includes a nested pair of compression springs 1270, 1272 that act in unison to urge the piston 66 and the driver blade 74 towards the BDC position.

A lifter assembly 1258 is positioned between the drive mechanism 1246 and the firing mechanism 1262 and is operated by the drive mechanism 1246 to return the piston 1266 and the driver blade 1274 towards a top-dead center (TDC) position, against the bias of the biasing member 1270, 1272. During a driving cycle, the biasing member 1270, 1272 of the firing mechanism 1262 urges the driver blade 1274 and piston 1266 from the TDC position towards the BDC position to fire a fastener into the workpiece. The lifter assembly 1258, which is driven by the drive mechanism 1246, is operable to move the piston 1266 and the driver blade 1274 from the BDC position toward the TDC position, stopping short of the TDC position at an intermediate ready position, so the firing mechanism 1262 is ready for a subsequent fastener driving operation.

Figure 29:
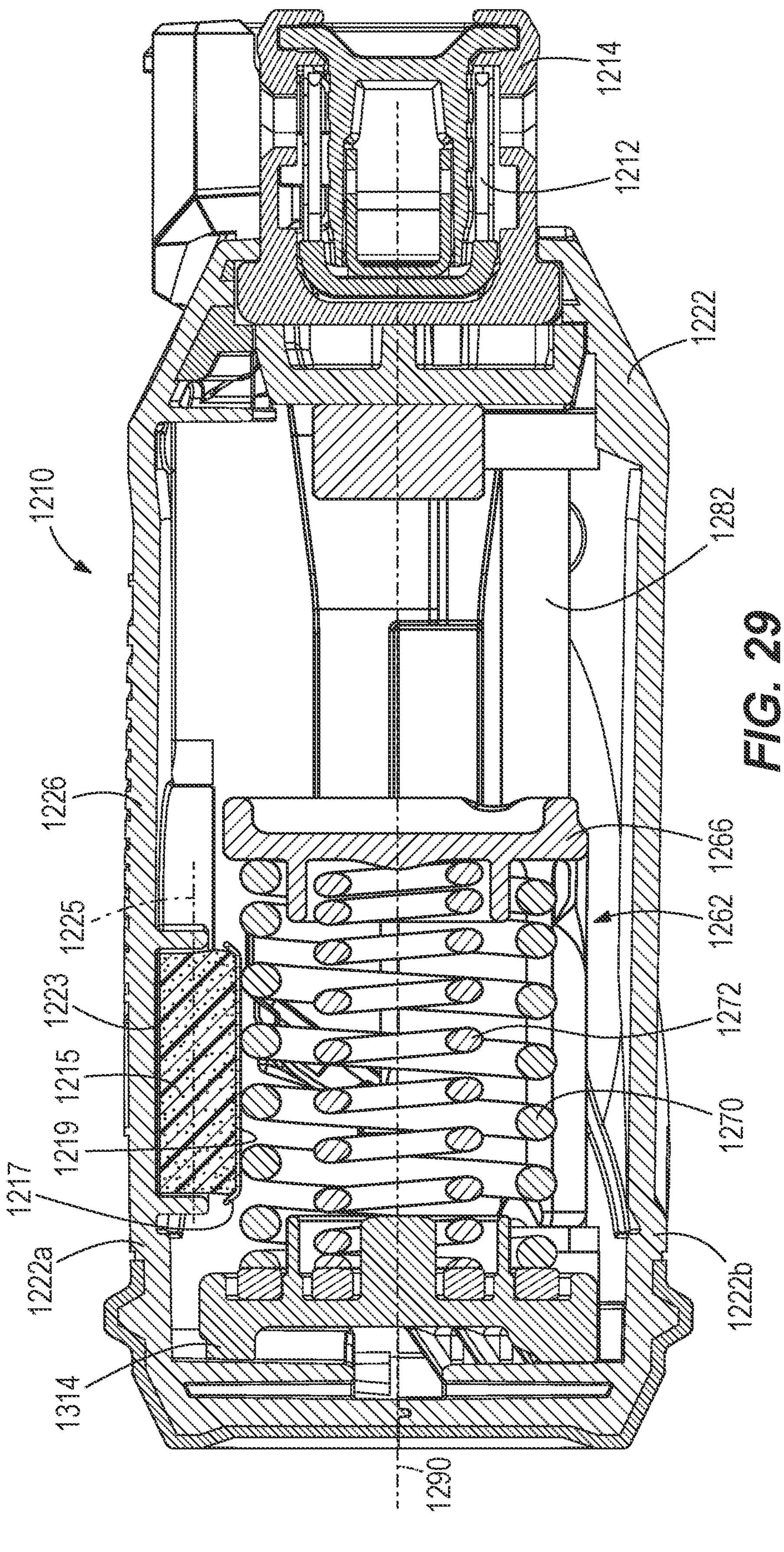
FIG. 29 is a top, cross-sectional view of the powered fastener driver of FIG. 28, illustrating the vibration dampening structure.

Now with reference to FIG. 29, the powered fastener driver 1210 includes a damper 1215 positioned between the firing mechanism 1262 and the head portion 1226 of the housing 1222. The damper 1215 further includes a wear-resistance layer 1217 in contact with the biasing member 1270. The wear-resistance layer 1217 includes opposing end portions that are angled away from the biasing member 1270 (e.g., upwards) to reduce binding between the biasing member 1270 and the damper 1215.

In the illustrated embodiment, the damper 1215 is a foam pad and the wear-resistance layer 1217 is formed of a wear-resistant material such as high-density polyethylene (HDPE), nylon, ultra-high-molecular-weight polyethylene (UHMW), or the like. In other embodiments, the damper 1215 may have an alternative construction (e.g., rubber, polyurethane, a viscoelastic substance, or the like). The damper 1215 includes a first side 1219 in engagement with an outer diameter of the biasing member 1270 and a second side 1223 in engagement with an internal surface of the head portion 1226. In the illustrated embodiment, the first side 1219 of the damper 1215 includes the wear-resistance layer 1217.

In the illustrated embodiment, the damper 1215 is a single pad coupled to the first housing portion 1222*a* of the housing 1222. In other embodiments, the damper 1215 may include one or more pads coupled to the first or second housing portions 1222*a*, 1222*b*. For example, one or more pads may be coupled to the first housing portion 1222*a* and one or more pads may be coupled to the second housing portion 1222*b* to collectively form the damper 1215. The damper 1215 is configured to attenuate vibration and noise from the biasing member 1270 as the driver blade 1274 moves from the top dead center position toward the bottom dead center position during a fastener driving operation.

Now with reference to FIGS. 28-32, the driver 1210 further includes a primary guide member (e.g., primary guide post 1280) that slidably supports the piston 1266 and a secondary guide member (e.g., secondary post 1282), which slidably supports a bracket 1286 coupled for movement with the piston 1266, spaced from the primary guide post 1280. The secondary post 1282 is positioned between the primary guide post 1280 and the lifter assembly 1258 and is configured to slidably support the bracket 1286. Because in the illustrated embodiment the piston 1266 and the bracket 86 are integrally formed as a single piece, both of the primary and secondary guide posts 1280, 1282 slidably support the piston 1266.

In the illustrated embodiment, a primary guide axis 1290 extends centrally through the primary guide post 1280 and a secondary guide axis 1294 extends centrally through the secondary post 1282. The primary guide axis 1290, the secondary guide axis 1294, and the drive axis 1278 are oriented parallel with each other and are each transverse to the motor axis 1276. In other embodiments, the fastener driver 1210 may include a single guide post. In the illustrated embodiment, the damper 1215 is offset from the primary guide axis 1290 (FIG. 29). Further, a damper axis

1225 that extends centrally through the damper 1215 is parallel to the primary guide axis 1290.

Figure 30:
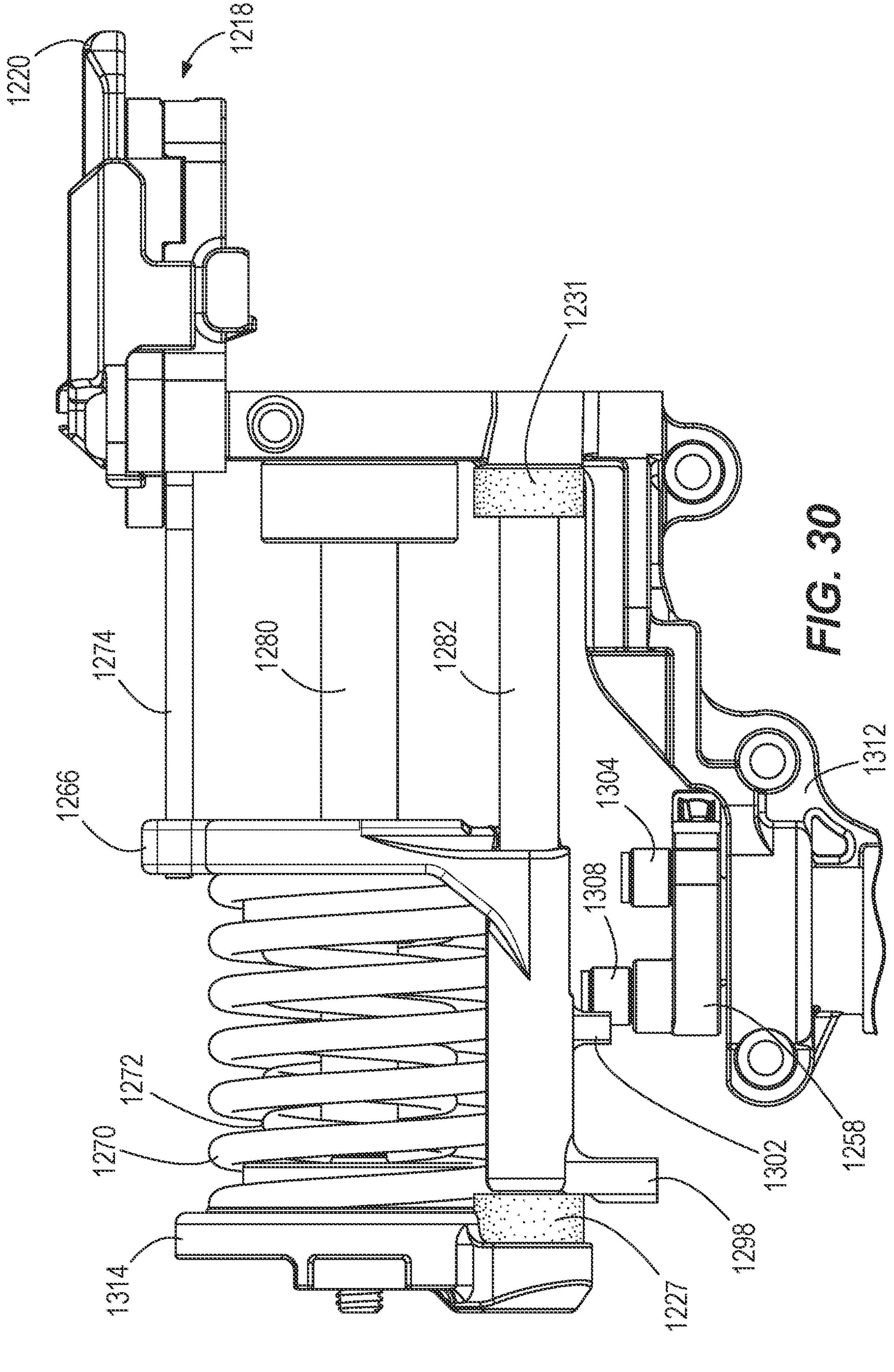
FIG. 30 is a side view of the drive mechanism, the firing mechanism, and the lifter assembly of the powered fastener driver of FIG. 28, illustrating the driver blade in a top dead center position where a first lubricant member is compressed.
Figure 31:
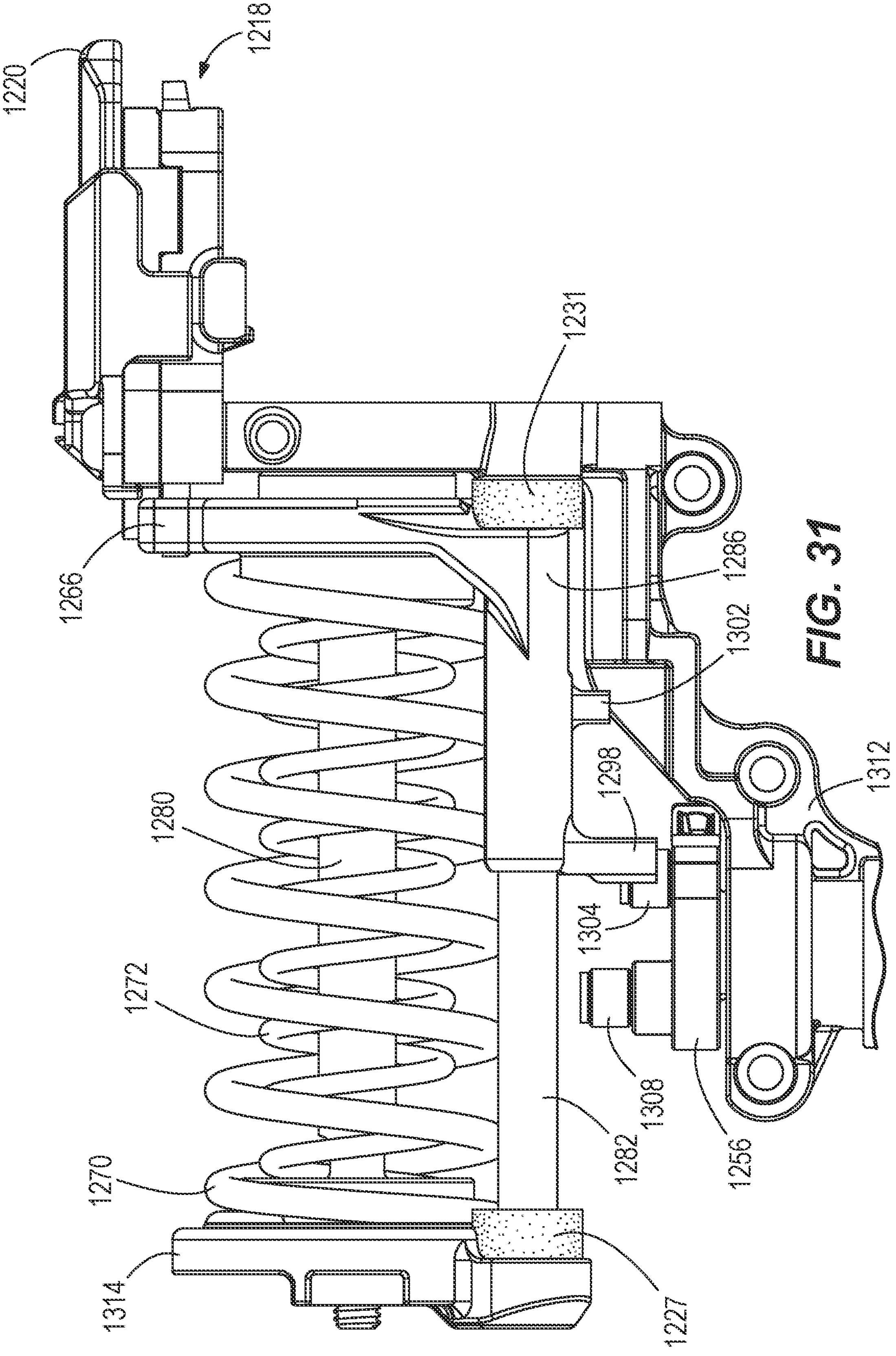
FIG. 31 is a side view of the drive mechanism, the firing mechanism, and the lifter assembly of the powered fastener driver of FIG. 28, illustrating the driver blade in a bottom dead center position where a second lubricant member is compressed.
Figure 32:
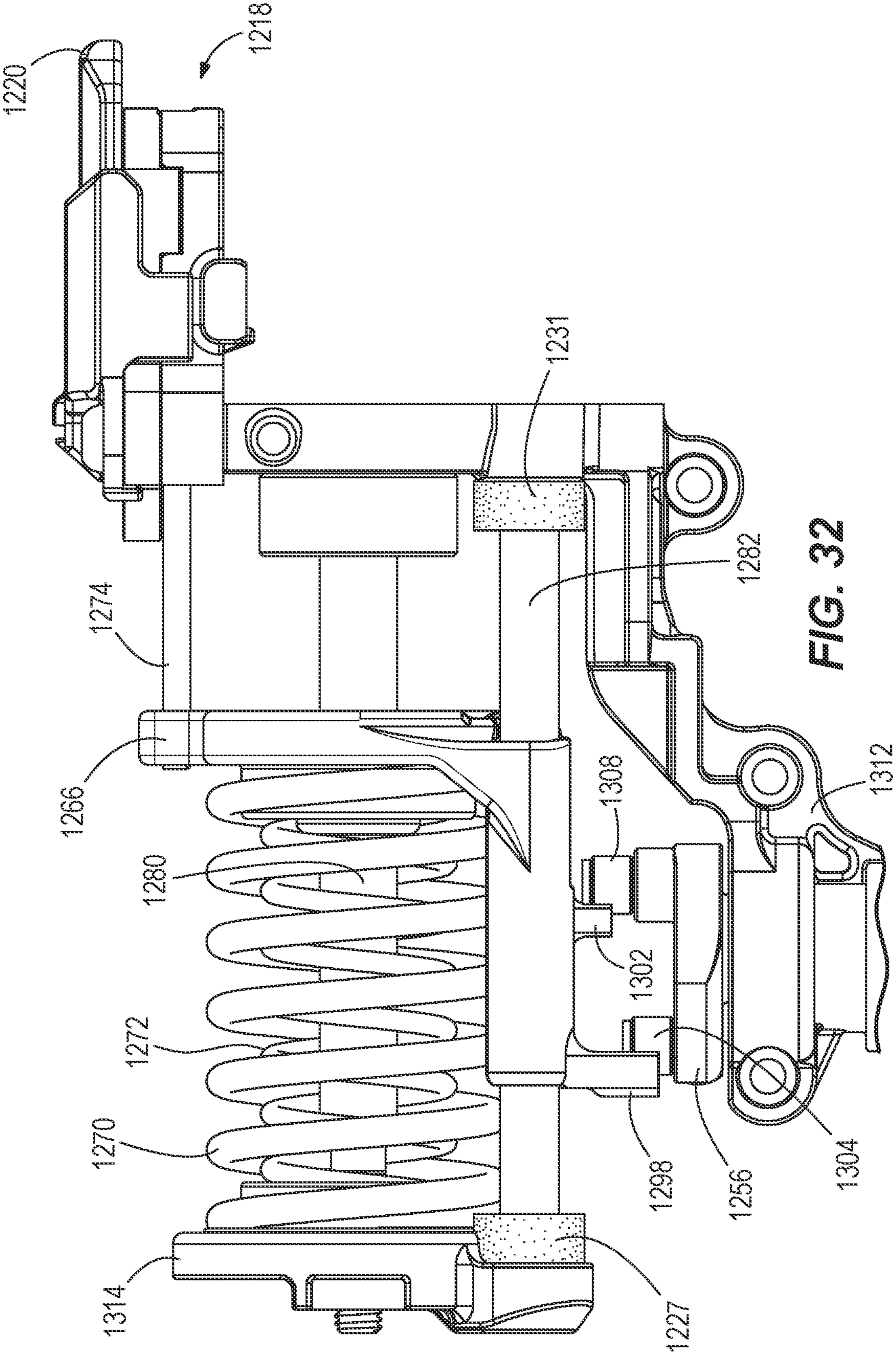
FIG. 32 is a side view of the drive mechanism, the firing mechanism, and the lifter assembly of the powered fastener driver of FIG. 28, illustrating a driver blade in a standby position.
Figure 33:
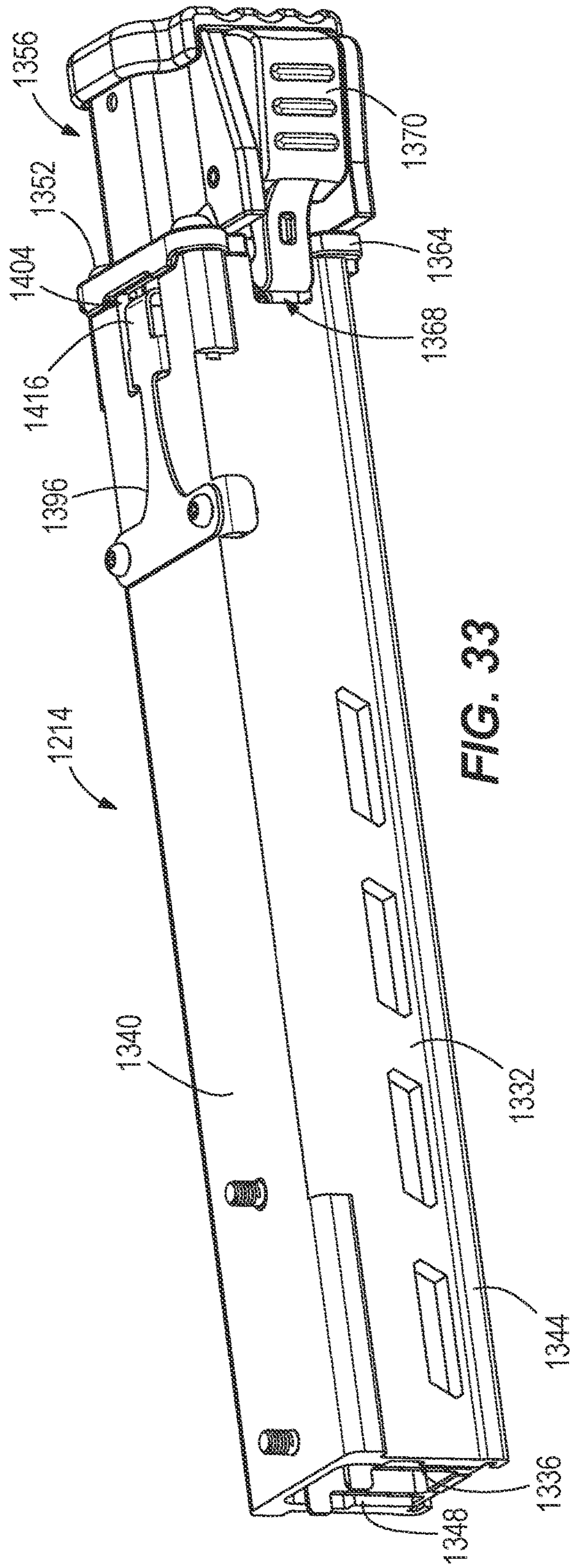
FIG. 33 is a perspective view of a magazine of the powered fastener driver of FIG. 28, illustrating a pusher latch.

With reference to FIGS. 30-32, a first lubrication member 1227 and a second lubrication member 1231 are each supported on the secondary guide post 1282. The first and second lubrication members 1227, 1231 are configured to release a lubricant to the secondary guide post 1282 in response to the piston 1266 reaching the top dead center position (FIG. 30) or the bottom dead center position (FIG. 31). The secondary guide post 1282 includes a first end coupled to an end cap 1314 and a second end coupled to a frame 1312 proximate the nosepiece 1218. The first lubrication member 1227 is coupled to the first end of the secondary guide post 1282 and the second lubrication member 1231 is coupled to the second end of the secondary guide member 1282. In the illustrated embodiment, the first and second lubrication members 1227, 1231 are felt washers that are saturated with lubricant. In other embodiments, the lubrication members 1227, 1231 may have an alternative construction.

In other embodiments, the powered fastener driver 1210 may include fewer (e.g., one) or more (e.g., three, four) lubrication members. For example, only a single lubrication member may be positioned on either the primary guide post 1280 or the secondary guide post 1282. In some embodiments, the powered fastener driver 1210 may include only a primary guide post 1280. In such an embodiment, one or more lubrication members may be positioned on the primary guide post 1280.

During operation, the lifter assembly 1258 is driven to rotate in a first direction by the drive mechanism 1246 so first and second eccentric pins 1304, 1308 of the lifter assembly 1258 engage the first and second protrusions 1298, 1302 in sequence, which returns the piston 1266 and the driver blade 1274 from the BDC position (FIG. 31) towards a TDC position (FIG. 30). As the piston 1266 approaches the BDC position, the bracket 1286 compresses the second lubrication member 1231 to release lubricant to the secondary guide post 1282. As the piston 1266 approaches the TDC position (FIG. 30), the bracket 1286 compresses the first lubrication member 1227 to release lubricant to the secondary post 1282. At the conclusion of a first drive cycle, the motor 1250 rotates the output shaft 1256, and therefore the lifter assembly 1258, about a motor axis 1276 to drive the piston 1266 and the driver blade 1274 toward the TDC position, compressing the biasing members 1270, 1272. Prior to reaching the TDC position, the motor 1250 is deactivated and the piston 1266 and the driver blade 1274 are held in a ready position (FIG. 32), which is located between the TDC and the BDC positions, concluding a first drive cycle. As such, during each drive cycle both the first and second lubrication member 1227, 1231 are compressed to release lubricant.

Now with reference to FIGS. 33-40, the magazine 1214 includes an outer magazine cover 1332 and an inner magazine body 1336 received within the outer magazine cover 1332. The inner magazine body 1336 is slidable relative to the outer magazine cover 1332 between a first, closed position (FIG. 33), and a second, open position. The magazine 1214 includes a top surface 1340, which is secured to the driver (FIG. 28), and a bottom surface 1344 that engages the workpiece and is opposite the top surface 1340. The outer magazine cover 1332 includes a first, front portion 1348 adjacent the nosepiece 1218 (FIG. 28), and a second, rear portion 1352 adjacent the battery receptacle 1234. The inner magazine body 1336 includes a front portion 1350 and a rear portion 1354 opposite the front portion 1348. For example, when the magazine 1214 is in the closed position, the inner magazine body 1336 is positioned entirely within an interior cavity defined by the outer magazine cover 1332 so the front portion 1350 and the rear portion 1354 of the inner magazine body 1336 respectively aligns with the front portion 1348 and the rear portion 1352 of the outer magazine cover 1332.

A lock assembly 1356 is positioned at the rear portion 1352 of the inner magazine body 1336. The lock assembly 1356 includes a flange portion 1360 (FIG. 34) positioned within the inner magazine body 1336, which secures the lock assembly 1356 to the inner magazine body 1336. The lock assembly 1356 is configured to selectively couple the inner magazine body 1336 to the outer magazine cover 1332 to maintain the inner magazine body 1336 in the closed position.

With reference to FIGS. 34 and 36-40, the inner magazine body 1336 includes an extruded rail 1372 defining the fastener channel 1376 in which the staples 1212 are received (FIG. 28). The outer magazine cover 1332 includes an internal rib 1413 and an external rib 1415 (FIG. 36), which each extend inward from each of the side walls 1382 of the outer magazine cover 1332. The internal and external ribs 1413, 1415 each include a first end proximate the front portion 1350 of the outer magazine cover 1332 and a second end located between the front portion 1350 and the rear portion 1354 of the outer magazine cover 1332.

The internal rib 1413 and the external rib 1415 each extend a length L1 of the outer magazine cover 1332, which is a portion of the total length of the outer magazine cover 1332. The internal and external ribs 1413, 1415 reduce a width of an opening formed at the bottom of the outer magazine cover 1332 to restrict the collated fastener strips 1212 from being removed from and/or installed into the fastener channel 1376. A second length L2 of the outer magazine cover 1332 is devoid of the internal and external ribs 1413, 1415 and defines an installation region where the collation fastener strips 1212 can be individually inserted when the magazine body 1336 is in the open position). In the illustrated embodiment, the length L1 is approximately 40 percent of the overall length of outer magazine cover 1332 (e.g., L1+L2). In some embodiments, the length L1 may be in a range from 20 to 60 percent of the overall length of the outer magazine cover 1332. In some embodiments the length L1 may be in a range from 30 to 60 percent of the overall length of the outer magazine cover 1332.

Figure 34:
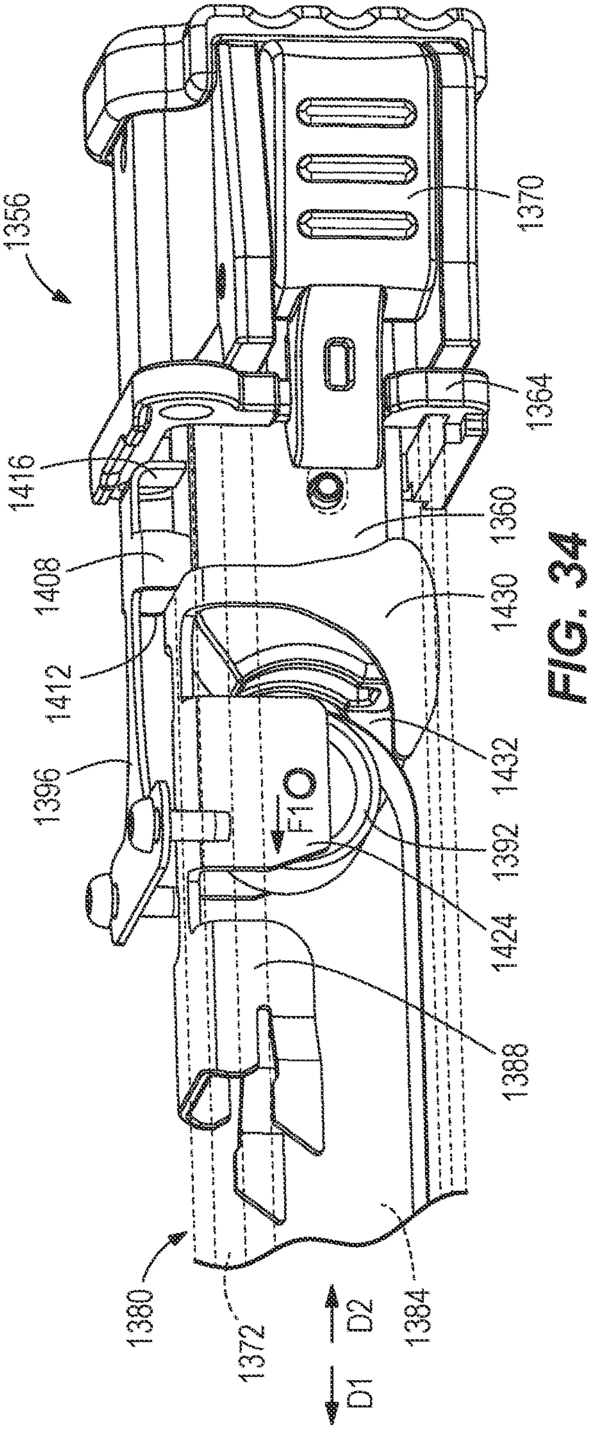
FIG. 34 is another perspective view the magazine of FIG. 32, with a portion of the magazine removed for clarity to illustrate the pusher latch, a pusher body, and a biasing member configured to apply a first force to the pusher body in the first direction.
Figure 35:
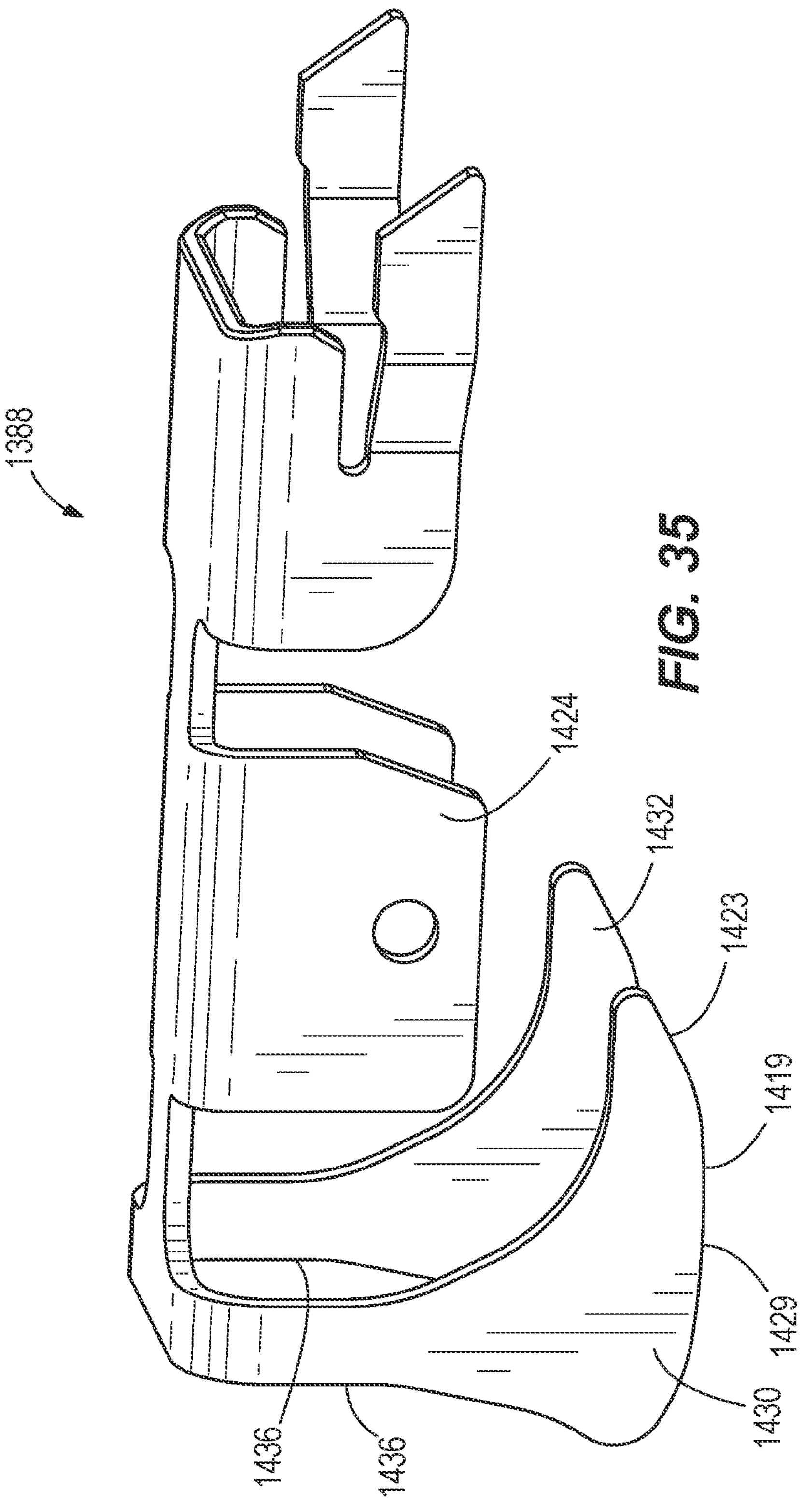
FIG. 35 is a perspective view of the pusher body.
Figure 36:
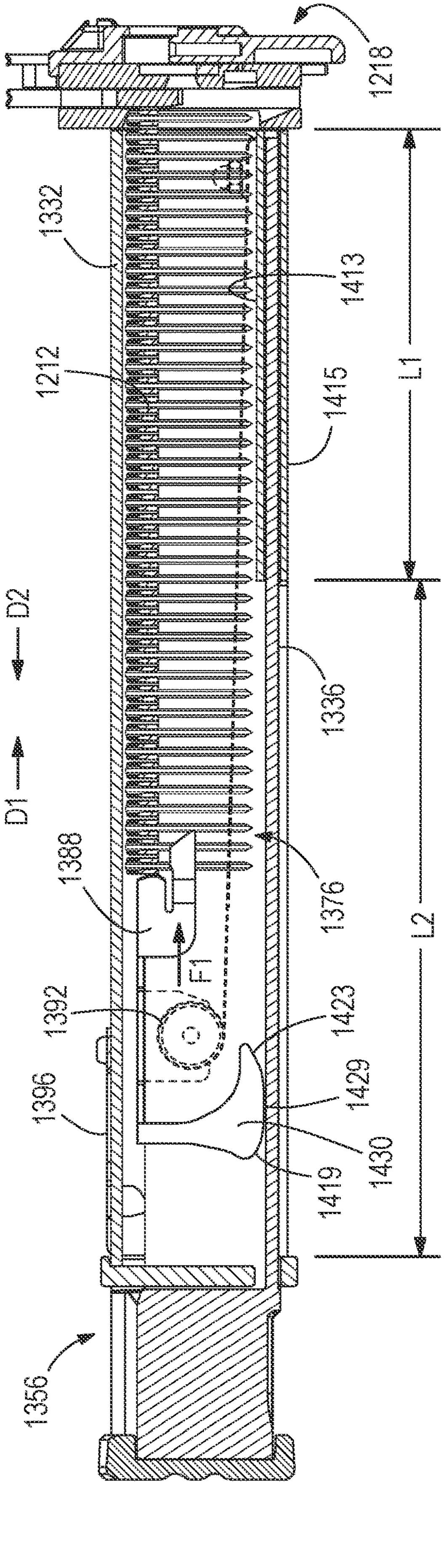
FIG. 36 is a side cross-sectional view of the magazine of FIG. 32, illustrating the pusher body in a first position.

With reference to FIGS. 34 and 35, the magazine 1214 further includes a pusher body 1388 (FIGS. 34 and 35) positioned within the fastener channel 1376 of the magazine 1214 and a latch 1396 (FIG. 34) coupled to the top surface 1340 of the outer magazine cover 1332. The pusher body 1388 is slidably coupled to the magazine 1214 and biases the collated fastener strip toward the front portion 1348 of the magazine 1214. In the illustrated embodiment, the magazine 1214 includes a biasing member (e.g., roll coil spring 1392; FIG. 34) configured to bias the pusher body 1388 toward the front portion 1348 of the magazine 1214 (i.e., toward the nosepiece 18). In other words, the biasing member 1392 applies a first force F1 in a first direction D1 to bias the pusher body 1388 towards the nosepiece 1218 when the magazine body 1336 is in the closed position.

The latch 1396 includes a latch projection 1416 that is received within an opening 1404 defined in the top surface 1340 of the outer magazine cover 1332 and first and second projections 1408, 1412 oriented on each side of the latch 1396. The latch projection 1416 is biased inward toward the flange portion 1360 of the lock assembly 1356 (e.g., downward from the frame of reference of FIG. 34) through the opening 1404.

Figure 37:
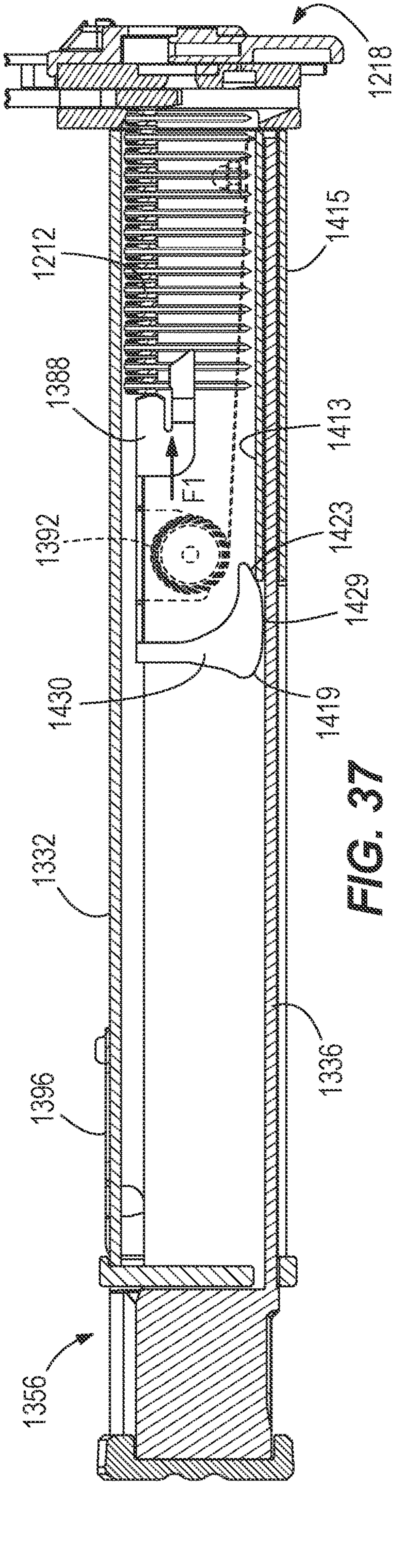
FIG. 37 is a side cross-sectional view of the magazine of FIG. 32, illustrating the pusher body in a first intermediate position.
Figure 38:
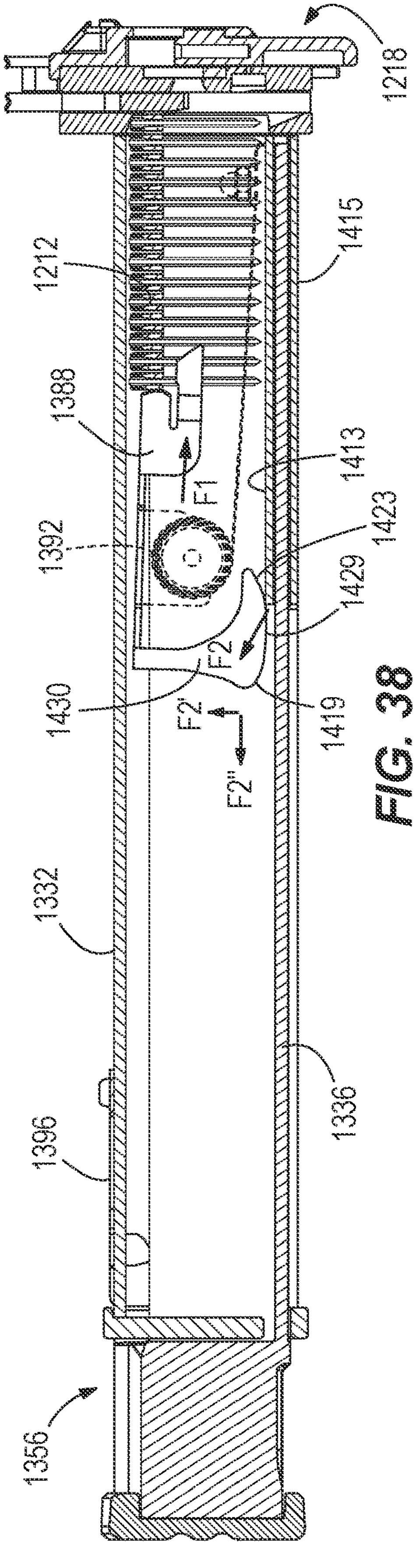
FIG. 38 is a side cross-sectional view of the magazine of FIG. 32, illustrating the pusher body in a second intermediate position where a force-application means applies a second force to the pusher body in a second direction that is different than the first direction.

The pusher body 1388 is configured to straddle the edge portion 180 and the sidewalls 1384 of the rail 1372. The pusher body 1388 defines a main body 1424 that supports the biasing member 1392 and first and second arm members 1430, 1432. Each arm member 1430, 1432 includes a contact surface 1436 (FIG. 13) configured to contact the first and second projections 1408, 1412, respectively, of the latch 1396. The pusher body 1388 is selectively engageable with the latch 1396 for maintaining the pusher body 1388 in a latched position (e.g., for loading). The pusher body 1388 further defines a second contact surface 1419 that is configured to engage the internal rib 1413 of the outer magazine cover 1332 as the pusher body 1388 moves towards the front portion 1348 of the magazine 1214. The second contact surface 1419 forms a ramp portion defined by a first, angled portion 1423 and a second, curvilinear portion 1429. As the pusher body 1388 moves towards the front portion 1348 of the magazine 1214, the first, angled portion 1423 engages the internal rib 1413 (FIG. 37), which provides a smooth transition to the second, curvilinear portion 1429 (FIG. 38). In other embodiments, the pusher body 1388 may have an alternative construction (e.g., similar to the pusher body 188 in FIG. 12). In such an embodiment, the internal rib 1413 may include the ramp portion (e.g., defined by an angled portion and a curvilinear portion).

The engagement between the curvilinear portion 1429 of the second contact surface 1419 and the internal rib 1413 produces a second force F2 on the pusher body 1388 in a direction that is different than the first different D1. In the illustrated embodiment, the second force F2 is a vector having a first force component F2' perpendicular to the first direction and a second force component F2" applied to the pusher body 1388 in a second direction D2 that is opposite the first direction D1. In other words, the second force F2 (FIGS. 38 and 39) is applied to the pusher body 1388 in a direction different than the first force F1, which reduces the acceleration of the pusher body 1388 (e.g., from the biasing member 1392) as the pusher body 1388 approaches the front portion 1348 of the magazine 1212. In the illustrated embodiment, the engagement between the internal rib 1413 and the contact surface 1419 of the pusher body 1388 creates a frictional force between the pusher body 1388 and the internal rib. As such, the frictional force is the second force component F2" applied to the pusher body 1388.

In the illustrated embodiment, the internal rib 1413 is configured to form a means for applying a second force F2 to the pusher body 1388. The force-application means is configured to apply the second force F2 in a second direction D2 that is different than the first direction D1 to provide a controlled movement of the pusher body 1388 as the pusher body 1388 approaches the front portion 1348 of the magazine 1214. The force-application means therefore reduces or prevents potential damage of the pusher body 1388 when the magazine 1214 is closed without fasteners positioned within the fastener channel 1376. In addition, the force-application means provides a more controlled movement of the pusher body 1388 as the pusher body 1388 approaches the front portion 1348 of the magazine 1214.

While FIGS. 33-40 illustrate a two-part magazine (e.g., having an inner magazine body 1336 and an outer magazine cover 1332), it should be appreciated that in other embodiments the magazine may be a single piece magazine. In such an embodiment, the pusher body may be a bypass pusher that is slidably coupled to the magazine. In addition, while the internal rib 1413 forms the force-application means in the illustrated embodiment, it should be appreciated that the force-application means may be formed with an alternative construction.

For example, the force-application means may include a second biasing member that provides the second force F2 to the pusher body 1388. In other embodiments, the force-application means could be formed on any wall (e.g., side, top wall, bottom, etc.) on an internal or external portion of the magazine 1212 and the pusher body may include a ramp portion or contact surface formed on a corresponding portion of the pusher body 1388. In some embodiments, the ramp portion or contact surface of the pusher body 1388 may be formed on the portion of the main body 1424 that supports the biasing member 1392, the portion of the main body 1424 that contacts the fasteners 1212, or the like. In some embodiments, the contact surface may be formed on a top portion of the main body 1424 of the pusher body 1388, which is configured to engage with an internal surface defined by the top surface 1340 of the magazine 1214 (e.g., the force-application means). In other embodiments, the contact surface may be formed on one or both of the side portions of the main body 1424 of the pusher body 1388, which is configured to engage an internal surface defined by the sidewalls of the magazine 1214 (e.g., the force-application means). In some embodiments, the force-application means may be formed on an external portion of the magazine. In such an embodiment, the pusher body may include a structure that engages the force-application means.

In another embodiment, a portion of the magazine 1214 may include a material having a higher coefficient of friction than the remainder of the magazine 1214, which forms the force-application means. In such an embodiment, any portion of the pusher body 1388 may contact the material. In another embodiment, the pusher body 1388 may be formed as one or more pieces. In such an embodiment, the pusher body may start as separate pieces and a first piece may engage a second piece of the pusher body over a specific length in the magazine 1212. When the first piece of the pusher body engages the second piece, the first and second pieces may be coupled for movement together. In such an embodiment, the second piece of the pusher body may form the force-application means.

Now with reference to FIGS. 36-40, as the magazine 1214 is moved towards a closed position, the pusher body 1388 is automatically adjusted from the latched position to a released position by engagement between the flange portion 1360 of the lock assembly 1356 and the latch projection 1416 of the latch 1396 when the inner magazine body 1336 is slid toward the closed position. For example, the translation of the flange portion 1360 in the closing direction of the inner magazine body 1336 causes the latch projection 1416 to slide upward along an inclined face of the flange portion 1360, which deflects the latch 1396 upward (e.g., from the frame of reference of FIG. 34). As a result, a contact surface of the latch 1396 is moved above the contact surface 1436 of the pusher body 1388, which releases the pusher body 1388 to bias the collated strip of staples towards the nosepiece 1218.

Figure 39:
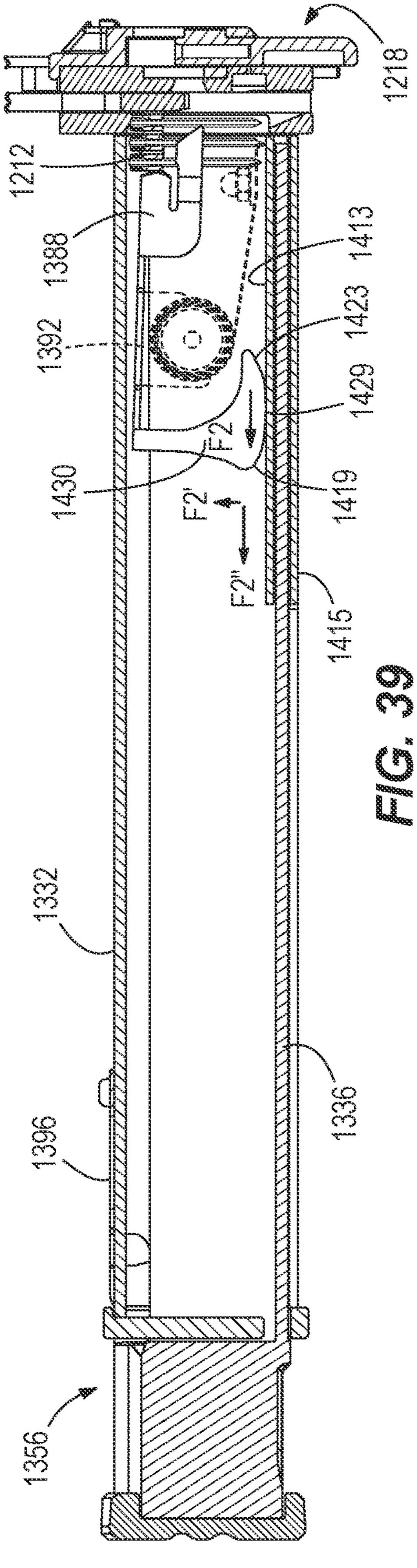
FIG. 39 is side cross-sectional view of the magazine of FIG. 32, illustrating the pusher body in a third intermediate position.
Figure 40:
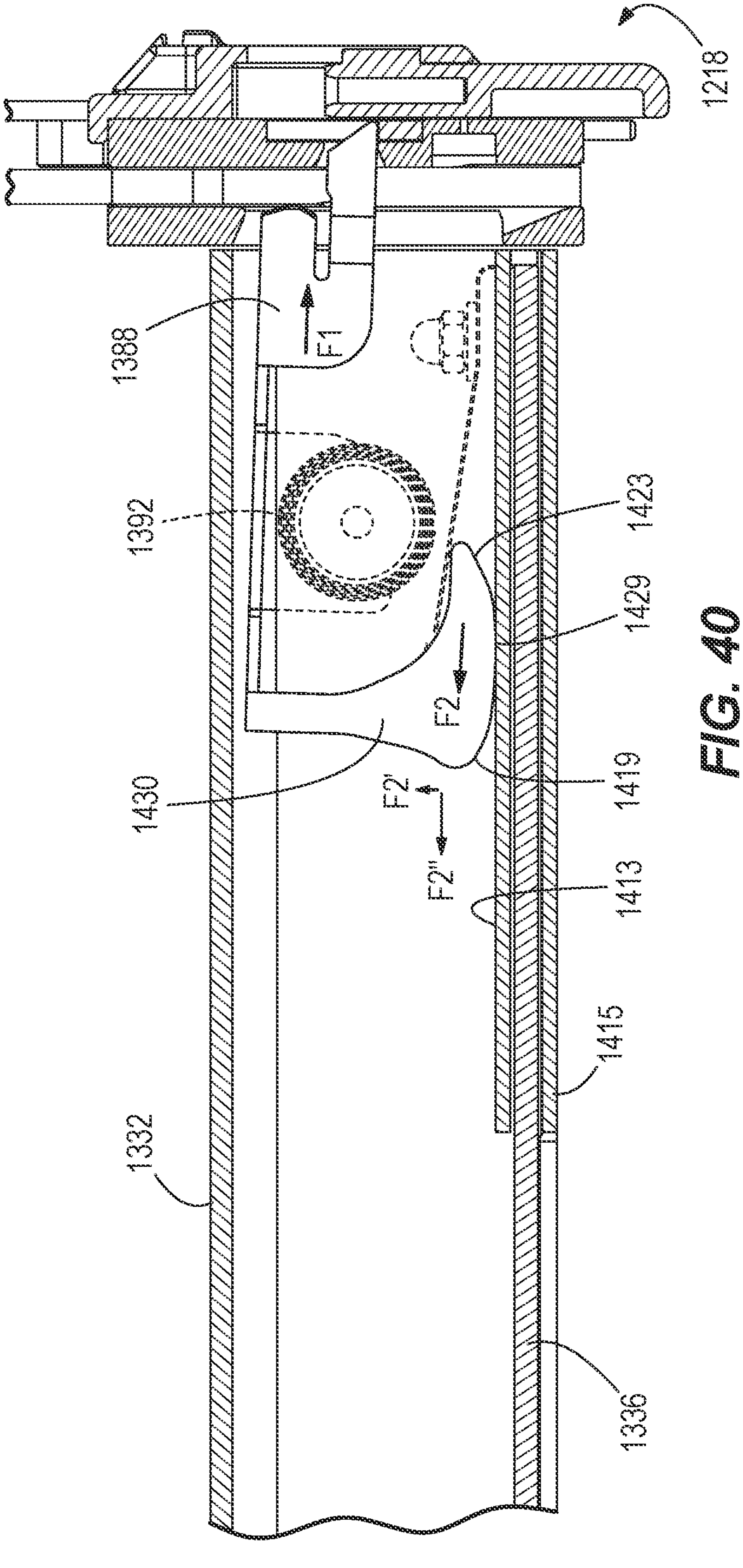
FIG. 40 is side cross-sectional view of the magazine of FIG. 32, illustrating the pusher body in a second position where the pusher body positioned proximate a nosepiece of the powered fastener driver of FIG. 28.

When there are fasteners 1212 in the magazine 1214, the pusher body 1388 engages the rearward most fasteners 1212, which urges the fasteners 1212 towards the nosepiece 1218. When the amount of fasteners 1212 in the magazine 1214 is low or if no fasteners are positioned within the magazine 1214, the angled portion 1423 of the second contact surface 1419 of the pusher body 1388 engages the internal rib 1413 (FIG. 37). The angled portion 1423 provides a smooth translation to the curvilinear portion 1427 of the pusher body 1388. As the pusher body 1388 continued to move towards the nosepiece 1218, the engagement between the internal rib 1318 and the curvilinear portion 1429 provides the second force F2 on the pusher body 1388 (FIGS. 38-40). The second forces F2 is applied in the different direction of the first force F1 and provides controlled movement of the pusher body 1388 as it approaches the nosepiece 1218.

Although the invention has been described in detail with reference to certain preferred embodiments, variations and modifications exist within the scope and spirit of one or more independent aspects of the invention as described.

Various features of the invention are set forth in the following claims.

What is claimed is:

1. A fastener driver comprising:

a housing defining a head portion and a handle portion;

a drive mechanism positioned within the housing;

a firing mechanism including a piston, a driver blade attached to the piston, and a biasing member having a first end supported within the piston and a second end supported by the head portion, the biasing member configured to move the piston and the driver blade from a top dead center position toward a bottom dead center position;

a damper positioned between the firing mechanism and the head portion of the housing, the damper configured to attenuate one or more of noise or vibration from the firing mechanism as the driver blade moves from the top dead center position toward the bottom dead center position; and a lifter assembly operated by the drive mechanism to return the piston and the driver blade towards the top dead center position, against the bias of the biasing member, wherein the damper includes a first side in engagement with an outer diameter of the biasing member and a second side in engagement with an internal surface of the head portion, and wherein the first side of the damper includes a wear-resistance layer configured to contact the biasing member.

2. The fastener driver of claim 1, wherein the damper is a foam pad.

3. The fastener driver of claim 1, wherein the wear-resistance layer includes opposing end portions that are angled away from the biasing member.

4. The fastener driver of claim 1, the damper is configured to attenuate one or more of noise or vibration from the biasing member.

5. The fastener driver of claim 1, wherein the housing is longitudinally split at a parting line into a first housing portion and a second housing portion, and wherein the damper is positioned between the first housing portion and the biasing member.

6. The fastener driver of claim 1, further comprising a primary guide member supported within the head portion of the housing, wherein the primary guide member defines a primary guide axis along which the piston is slidable.

7. The fastener driver of claim 6, wherein the damper is offset from the primary guide axis.

8. The fastener driver of claim 6, wherein a damper axis extends centrally through the damper, and wherein the damper axis is parallel to the primary guide axis.

9. The fastener driver of claim 1, wherein the biasing member comprises a first compression spring and a second compression spring nested within the first compression spring.

10. The fastener driver of claim 9, further comprising an end cap comprising a first recess and a second recess surrounded by the first recess, wherein the first recess is configured to support an end of the first compression spring, and wherein the second recess is configured to support an end of the second compression spring.

11. The fastener driver of claim 10, further comprising a first washer positioned within the first recess of the end cap and a second washer positioned within the second recess of the end cap, and wherein the first washer is positioned between the first compression spring and the end cap and the second washer is positioned between the second compression spring and the end cap.

12. The fastener driver of claim 1, wherein the head portion of the housing defines a recess positioned adjacent the biasing member, and wherein the damper is partially positioned within the recess.

13. A fastener driver comprising:

a housing defining a head portion and a handle portion;

a drive mechanism positioned within the housing;

a firing mechanism including a piston, a driver blade attached to the piston, and a biasing member having a first end supported within the piston and a second end supported by the head portion, the biasing member configured to move the piston and the driver blade from a top dead center position toward a bottom dead center position;

a damper positioned between the biasing member and the head portion of the housing, the damper configured to engage the biasing member to attenuate one or more of noise or vibration from the firing mechanism as the driver blade moves from the top dead center position toward the bottom dead center position; and a lifter assembly operated by the drive mechanism to return the piston and the driver blade towards the top dead center position, against the bias of the biasing member, wherein the head portion defines a recess positioned adjacent the biasing member, and wherein the damper is at least partially disposed within the recess.

14. The fastener driver of claim 13, wherein the housing is longitudinally split at a parting line into a first housing portion and a second housing portion, and wherein the recess is formed in the first housing portion.

15. The fastener driver of claim 13, wherein the piston includes a cavity supporting the first end of the biasing member.

16. The fastener driver of claim 13, wherein the damper includes a wear-resistance layer configured to contact the biasing member.

* * * * *